(12) United States Patent
Liassides et al.

(10) Patent No.: US 11,297,385 B1
(45) Date of Patent: Apr. 5, 2022

(54) CONTENT-MODIFICATION SYSTEM WITH FEATURE FOR MANAGING MULTIPLE CONTENT-MODIFICATION REQUESTS

(71) Applicant: Roku, Inc., San Jose, CA (US)

(72) Inventors: Stefanos Christakis Liassides, Cardiff (GB); Brian Patrick Jentz, Buxton (GB)

(73) Assignee: Roku, Inc., San Jose, CA (US)

( * ) Notice: Subject to any disclaimer, the term of this patent is extended or adjusted under 35 U.S.C. 154(b) by 0 days.

(21) Appl. No.: 17/146,569

(22) Filed: Jan. 12, 2021

(51) Int. Cl.
*H04N 21/44* (2011.01)
*H04N 21/458* (2011.01)
*H04N 21/81* (2011.01)
*H04N 21/426* (2011.01)

(52) U.S. Cl.
CPC . *H04N 21/44016* (2013.01); *H04N 21/42607* (2013.01); *H04N 21/458* (2013.01); *H04N 21/812* (2013.01)

(58) Field of Classification Search
CPC ....... H04N 21/44016; H04N 21/42607; H04N 21/458; H04N 21/812
See application file for complete search history.

(56) References Cited

U.S. PATENT DOCUMENTS

| | | | | |
|---|---|---|---|---|
| 6,389,433 B1* | 5/2002 | Bolosky | ............ | G06F 11/1453 707/749 |
| 9,781,053 B1* | 10/2017 | Allen | ............ | H04L 47/74 |
| 2002/0083435 A1* | 6/2002 | Blasko | ............ | H04N 21/4331 725/14 |
| 2003/0036974 A1* | 2/2003 | Allen | ............ | G07F 17/0014 705/14.66 |
| 2003/0056228 A1* | 3/2003 | Foster | ............ | H04N 7/17309 725/133 |
| 2005/0216942 A1* | 9/2005 | Barton | ............ | H04N 21/43632 725/97 |
| 2006/0206611 A1* | 9/2006 | Nakamura | ............ | H04L 61/103 709/226 |
| 2009/0074387 A1* | 3/2009 | Adachi | ............ | H04N 5/772 386/331 |
| 2011/0093900 A1* | 4/2011 | Patel | ............ | H04N 21/2343 725/54 |

(Continued)

*Primary Examiner* — Jefferey F Harold
*Assistant Examiner* — Timothy R Newlin
(74) *Attorney, Agent, or Firm* — McDonnell Boehnen Hulbert & Berghoff LLP

(57) ABSTRACT

In one aspect, a method includes receiving a first request for first supplemental content for use by a content-presentation device in performing a first content-modification operation, receiving a second request for second supplemental content for use by a tuner device in performing a second content-modification operation. The method also includes determining that the content-presentation device is connected to the tuner device, and based at least in part on the first and second requests, determining that the first and second requests are associated with the same modifiable content-segment, and, in response to the determinations, using one or more parameters as a basis to select for performance an action from a set of actions including a first action that facilitates performance of the first content-modification operation and a second action that facilitates performance of the second content-modification operation.

20 Claims, 12 Drawing Sheets

(56) References Cited

U.S. PATENT DOCUMENTS

| | | | |
|---|---|---|---|
| 2011/0271010 A1* | 11/2011 | Kenchammana | G06F 3/06 |
| | | | 709/244 |
| 2012/0054616 A1* | 3/2012 | Mittal | H04N 21/42209 |
| | | | 715/722 |
| 2013/0166737 A1* | 6/2013 | Christenson | H04N 21/61 |
| | | | 709/224 |
| 2013/0246631 A1* | 9/2013 | Gonzales | H04L 65/80 |
| | | | 709/227 |
| 2014/0081926 A1* | 3/2014 | Adams | G06F 16/51 |
| | | | 707/692 |
| 2015/0095486 A1* | 4/2015 | Gossain | H04L 61/2046 |
| | | | 709/224 |
| 2016/0006818 A1* | 1/2016 | Van Den Abeele | |
| | | | H04L 67/2819 |
| | | | 709/227 |
| 2018/0084305 A1* | 3/2018 | Sprenger | H04N 21/433 |
| 2020/0359080 A1* | 11/2020 | Ashbacher | H04N 21/4316 |

* cited by examiner

| Time Period | Content-Distribution System 102 | Content-Presentation Device 104 | Fingerprint-Matching Server 106 | Content-Management System 108 | Data-Management System 110 | Supplemental-Content Delivery System 112 |
|---|---|---|---|---|---|---|
| T1 | Transmit first content on a channel | | | | | |
| T2 | Generate first fingerprint data and first metadata | | | | | |
| T3 | Transmit first fingerprint data and first metadata | | | | | |
| T4 | | Receive second content | | | | |
| T5 | | Generate second fingerprint data and second metadata | | | | |
| T6 | | Transmit second fingerprint data and second metadata | | | | |
| T7 | | | Receive first fingerprint data and first metadata | | | |
| T8 | | | Receive second fingerprint data and second metadata | | | |

Figure 4A

| | | | | | |
|---|---|---|---|---|---|
| T9 | | Compare first fingerprint data and second fingerprint data | | | |
| T10 | | Detect a match between first fingerprint data and second fingerprint data | | | |
| T11 | | Identify the channel on which the second content is being received | | | |
| T12 | | Generate metadata associated with the identified channel | | | |
| T13 | | Transmit an indication of the identified channel and the associated metadata | | | |
| T14 | | | | | Receive the indication of the identified channel and the associated metadata |

Figure 4B

| | | | | | | | | | | |
|---|---|---|---|---|---|---|---|---|---|---|
| T15 | | | | | Determine historical content consumption data | | | | | |
| T16 | Transmit third content | | | | | | | | | |
| T17 | | Generate third fingerprint data and third metadata | | | | | | | | |
| T18 | | Transmit third fingerprint data and third metadata | | | | | | | | |
| T19 | | | | Receive modifiable content segment | | | | | | |
| T20 | | | | Generate fourth fingerprint data and fourth metadata | | | | | | |
| T21 | | | | Transmit fourth fingerprint data and fourth metadata | | | | | | |
| T22 | | | Receive third fingerprint data and third metadata | | | | | | | |
| T23 | | | Receive fourth fingerprint data and fourth metadata | | | | | | | |

Figure 4C

| | | | | | | |
|---|---|---|---|---|---|---|
| T24 | Compare at least a portion of third fingerprint data and at least a portion of fourth fingerprint data | | | | | |
| T25 | Detect a match between at least a portion of third fingerprint data and at least a portion of fourth fingerprint data | | | | | |
| T26 | Identify an upcoming content modification opportunity on the identified channel | | | | | |
| T27 | Transmit the third fingerprint data and the third metadata | | | | | |
| T28 | | | | | | Receive third fingerprint data and third metadata |
| T29 | | | | | | Receive fifth content |
| T30 | | | | | | Output for presentation fifth content |

Figure 4D

| T31 | Generate fifth fingerprint data and fifth metadata | | | | | |
|---|---|---|---|---|---|---|
| T32 | Compare the third fingerprint data and the fifth fingerprint data | | | | | |
| T33 | Detect a match between the third fingerprint data and the fifth fingerprint data | | | | | |
| T34 | Determine modification start time and modification end time | | | | | |
| T35 | Transmit a request for supplemental content | | | | | |
| T36 | | Receive request and select supplemental content | | | | |
| T37 | | Transmit request for link | | | | |
| T38 | | | | | | Transmit link |

Figure 4E

| T39 | | | Transmit link | | | |
|---|---|---|---|---|---|---|
| T40 | | | Receive link and retrieve supplemental content | | | |
| T41 | | | Perform content modification operation | | | |

Figure 4F

CONTENT-MODIFICATION SYSTEM WITH FEATURE FOR MANAGING MULTIPLE CONTENT-MODIFICATION REQUESTS

USAGE AND TERMINOLOGY

In this disclosure, unless otherwise specified and/or unless the particular context clearly dictates otherwise, the terms "a" or "an" mean at least one, and the term "the" means the at least one.

SUMMARY

In one aspect, a method includes receiving a first request for first supplemental content for use by a content-presentation device in performing a first content-modification operation relative to a modifiable content-segment that the content-presentation device is scheduled to receive. The method also includes receiving a second request for second supplemental content for use by a tuner device in performing a second content-modification operation relative to a modifiable content-segment that the tuner device is scheduled to receive. The method also includes determining that the content-presentation device is connected to the tuner device. The method also includes based at least in part on the first and second requests, determining that the first and second requests are associated with the same modifiable content-segment. The method also includes in response to determining that the content-presentation device is connected to the tuner device, and further in response to determining that the first and second requests are associated with the same modifiable content-segment, using one or more parameters as a basis to select an action from a set of actions that includes a first action that facilitates causing the content-presentation device to perform the first content-modification operation in accordance with the first request and a second action that facilitates causing the tuner device to perform the second content-modification operation in accordance with the second request. The method also includes performing the selected action.

In another aspect, a non-transitory computer-readable storage medium has stored thereon program instructions that, upon execution by a processor, cause performance of a set of operations. The set of operations includes receiving a first request for first supplemental content for use by a content-presentation device in performing a first content-modification operation relative to a modifiable content-segment that the content-presentation device is scheduled to receive. The set of operations also includes receiving a second request for second supplemental content for use by a tuner device in performing a second content-modification operation relative to a modifiable content-segment that the tuner device is scheduled to receive. The set of operations also includes determining that the content-presentation device is connected to the tuner device. The set of operations also includes based at least in part on the first and second requests, determining that the first and second requests are associated with the same modifiable content-segment. The set of operations also includes in response to determining that the content-presentation device is connected to the tuner device, and further in response to determining that the first and second requests are associated with the same modifiable content-segment, using one or more parameters as a basis to select an action from a set of actions that includes a first action that facilitates causing the content-presentation device to perform the first content-modification operation in accordance with the first request and a second action that facilitates causing the tuner device to perform the second content-modification operation in accordance with the second request. The set of operations also includes performing the selected action.

In another aspect, a computing system includes a processor and a non-transitory computer-readable storage medium, having stored thereon program instructions that, upon execution by the processor, cause performance of a set of operations. The set of operations includes receiving a first request for first supplemental content for use by a content-presentation device in performing a first content-modification operation relative to a modifiable content-segment that the content-presentation device is scheduled to receive. The set of operations also includes receiving a second request for second supplemental content for use by a tuner device in performing a second content-modification operation relative to a modifiable content-segment that the tuner device is scheduled to receive. The set of operations also includes determining that the content-presentation device is connected to the tuner device. The set of operations also includes based at least in part on the first and second requests, determining that the first and second requests are associated with the same modifiable content-segment. The set of operations also includes in response to determining that the content-presentation device is connected to the tuner device, and further in response to determining that the first and second requests are associated with the same modifiable content-segment, using one or more parameters as a basis to select an action from a set of actions that includes a first action that facilitates causing the content-presentation device to perform the first content-modification operation in accordance with the first request and a second action that facilitates causing the tuner device to perform the second content-modification operation in accordance with the second request. The set of operations also includes performing the selected action.

BRIEF DESCRIPTION OF THE DRAWINGS

FIGS. 4A, 4B, 4C, 4D, 4E, and 4F collectively make up a table showing example time-periods and corresponding operations that can be performed in connection with the example content-modification system.

DETAILED DESCRIPTION

I. Overview

Figure 1:
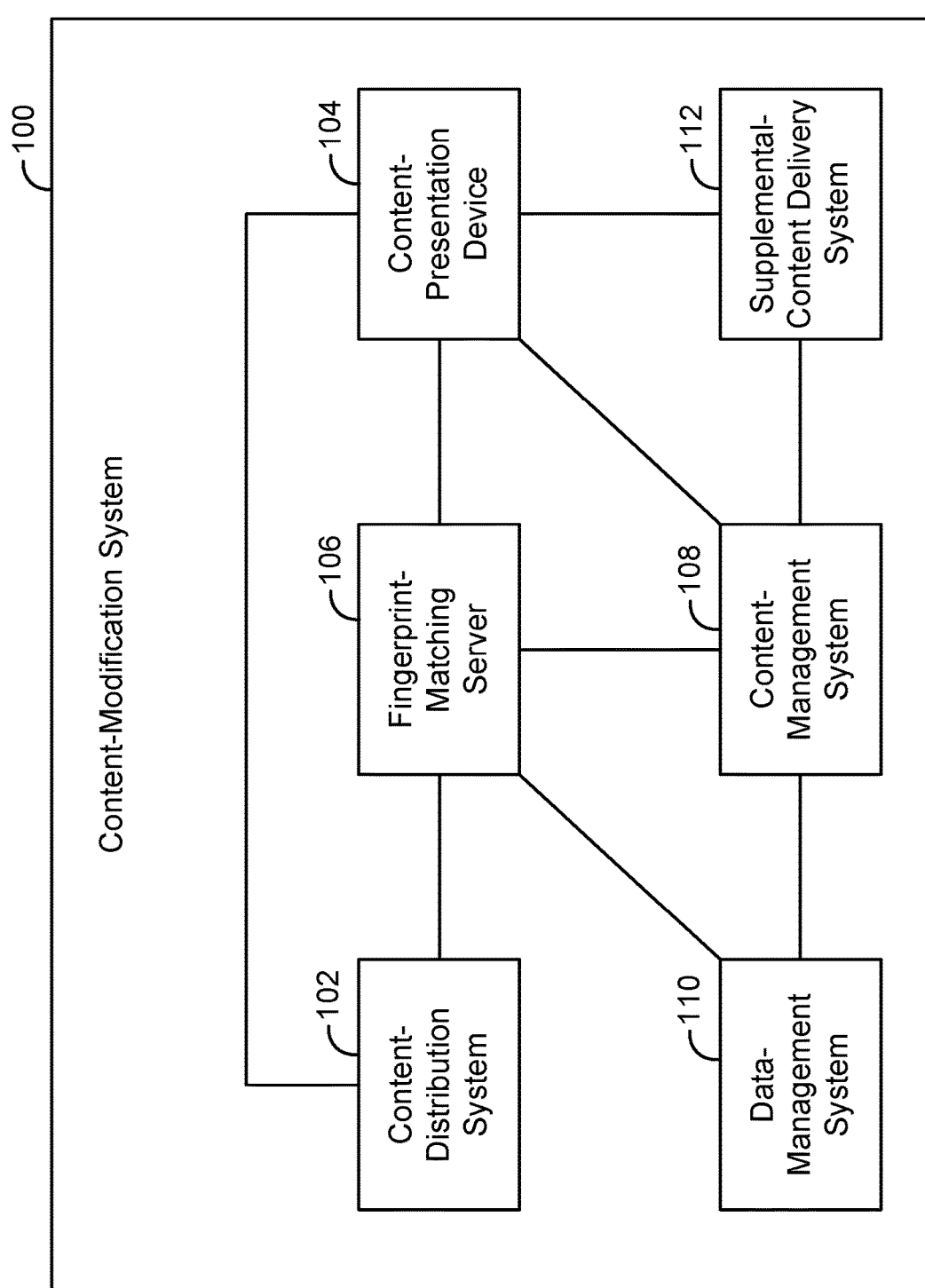
FIG. 1 is a simplified block diagram of an example content-modification system in which various described principles can be implemented.

To deliver and present content to end-users, a content provider can transmit the content to one or more content-distribution systems, each of which can in turn transmit the content to one or more respective content-presentation devices to be output for presentation to respective end-users. Such a hierarchical arrangement can facilitate convenient, widespread distribution of content.

By way of example, in order for a video content provider to deliver video content to end-users throughout the United States, the video content provider can transmit the video content by satellite or another medium to content-distribution systems that serve respective designated market areas (DMAs) within the United States. Each such content-distribution system can therefore receive the national satellite feed carrying the video content and can transmit the video content to television sets and/or set-top boxes in the content-distribution system's DMA, such that the video content can be output for presentation to respective end-users in that DMA. In practice, these content-distribution systems and their means of transmission to content-presentation devices can take various forms. For instance, a content-distribution system can be associated with a cable-television provider and can transmit video content to content-presentation devices of end-users who are cable-television subscribers through hybrid fiber/coaxial cable connections.

As such, in various scenarios, a content-distribution system can transmit content to a content-presentation device, which can receive and output the content for presentation to an end-user. In some situations, even though the content-presentation device receives content from the content-distribution system, it can be desirable for the content-presentation device to perform a content-modification operation so that the content-presentation device can output for presentation alternative content instead of at least a portion of that received content.

For example, in the case where the content-presentation device receives a linear sequence of content segments that includes a given advertisement segment positioned somewhere within the sequence, it can be desirable for the content-presentation device to replace the given advertisement segment with a different advertisement segment that is perhaps more targeted to the end-user (e.g., more targeted to the end-user's interests, demographics, etc.). As another example, it can be desirable for the content-presentation device to overlay on the given advertisement segment, overlay content that enhances the given advertisement segment in a way that is again perhaps more targeted to the end-user. The described content-modification system can facilitate providing these and other related features.

In one example, the content-modification system can include a fingerprint-matching server that can identify an upcoming content-modification opportunity on an identified channel, which it can do by comparing and detecting a match between two different instances of fingerprint data. Based on the detected match, the fingerprint-matching server can then transmit fingerprint data and metadata to the content-presentation device data to facilitate preparing the content-presentation device to perform a content-modification operation in connection with the identified upcoming content-modification opportunity.

However, in other cases, it may be desirable for the content-presentation device to use one or more alternative techniques to facilitate performing a content-modification operation.

For example, the fingerprint-matching server can use broadcast-schedule data to facilitate the content-presentation device performing a content-modification operation. Among other things, this can allow the content-presentation device to facilitate performing a content-modification operation without using fingerprint data or by using fingerprint data in a more limited fashion. This can be beneficial in the case where the content-presentation device does not receive or otherwise have access to fingerprint data, or where the use of fingerprint data is undesirable for one or more reasons (e.g., because fingerprint-based techniques may be computationally expensive).

In practice, a content-presentation device or other content display device of the content-modification system can be connected to a set-top box (STB) or other type of tuner device that is not part of the content-modification system and is associated with a content distributor such as a multi-channel video program distributor (MVPD). With such an arrangement, there can be situations where both the content-presentation device and the STB attempt to perform a content-modification operation with respect to an upcoming content-modification opportunity.

For example, in accordance with an upcoming content-modification opportunity, the content-presentation device can be scheduled to replace a modifiable content-segment (e.g., an advertisement designated as a candidate for replacement) with first supplemental content (e.g., a replacement advertisement) at a modification start-time. However, before the modification start-time, the STB might replace the modifiable content-segment with second supplemental content, different from the first supplemental content, such as a different replacement advertisement associated with an advertiser with which the MVPD has made an agreement to run advertisements. In this situation, the content that the content-presentation device receives can include the second supplemental content instead of the modifiable content-segment that the content-presentation device is expecting to receive.

As a result, beginning at the modification start-time of the content-modification opportunity, the content-presentation device might initiate replacement of the second supplemental content with the first supplemental content. Then, after a short period of time (e.g., a few seconds after the modification start-time), the content-presentation device might determine that the content that is being replaced is not the expected modifiable content-segment. For example, the content-presentation device can receive, from the fingerprint-matching server, reference fingerprint data representing the modifiable content-segment and locally compare the reference fingerprint data against query fingerprint data that is generated by the content-presentation device and that represents the content being received from the STB (e.g., the second supplemental content, instead of the modifiable content-segment). The content-presentation device can thus detect a mismatch between the reference fingerprint data and the query fingerprint data and can responsively stop performing the content-replacement operation.

Further, when performance of the content-replacement operation is stopped, the display of the second supplemental content might abruptly end after a few seconds worth of frames, and the first supplemental content might be displayed thereafter. Thus, the content-presentation device stopping performance of the content-modification operation after the content-modification operation has already begun can result in an undesirable user experience.

Accordingly, the present disclosure provides methods and systems that improve the content modification process for a content-modification system by managing multiple attempts to perform a content-modification operation in connection with an upcoming content-modification opportunity. In particular, the content-modification system can receive, from a content-presentation device and a tuner device (e.g., a STB), respective requests for supplemental content to facilitate performance of content-modification operations. The content-modification system can also determine that the content-presentation device and the tuner device are connected and are both attempting to perform content-modification operations with respect to the same modifiable content-segment.

In response, the content-modification system can use one or more parameters as a basis to decide whether to allow the content-presentation device to perform a content-modification operation or rather to allow the tuner device to perform a content-modification operation. The one or more parameters can include parameters associated with the respective supplemental content that would be used to perform the respective content-modification operations, such as a cost (e.g., a revenue/yield) associated with the supplemental content and/or a number of times content-presentation devices have received and presented the supplemental content. Additionally or alternatively, the one or more parameters can include parameters associated with the modifiable content-segment, such as a number of times content-presentation devices have received and presented the modifiable content-segment. As a specific example, if the content-presentation device and the tuner device are both attempting to replace an advertisement with a first and second replacement advertisement, respectively, the content-modification system might allow the content-presentation device to perform the replacement in response to the content-modification system determining that an expected cost per mile (CPM) lift for running the first replacement advertisement is higher than an expected CPM lift for running the second replacement advertisement. Other examples are possible as well.

With the disclosed methods and systems, the content-modification system can act as an efficient arbitrator for content-modification attempts made by two entities, and can reduce the likelihood that the content-presentation device's performance of the content-modification operation will be stopped partway through, thus improving user experience.

II. Architecture

A. Content-Modification System

FIG. 1 is a simplified block diagram of an example content-modification system 100. The content-modification system 100 can include various components, such as a content-distribution system 102, a content-presentation device 104, a fingerprint-matching server 106, a content-management system 108, a data-management system 110, and/or a supplemental-content delivery system 112.

The content-modification system 100 can also include one or more connection mechanisms that connect various components within the content-modification system 100. For example, the content-modification system 100 can include the connection mechanisms represented by lines connecting components of the content-modification system 100, as shown in FIG. 1.

In this disclosure, the term "connection mechanism" means a mechanism that connects and facilitates communication between two or more components, devices, systems, or other entities. A connection mechanism can be or include a relatively simple mechanism, such as a cable or system bus, and/or a relatively complex mechanism, such as a packet-based communication network (e.g., the Internet). In some instances, a connection mechanism can be or include a non-tangible medium, such as in the case where the connection is at least partially wireless. In this disclosure, a connection can be a direct connection or an indirect connection, the latter being a connection that passes through and/or traverses one or more entities, such as a router, switcher, or other network device. Likewise, in this disclosure, communication (e.g., a transmission or receipt of data) can be a direct or indirect communication.

The content-modification system 100 and/or components thereof can take the form of a computing system, an example of which is described below.

Notably, in practice, the content-modification system 100 is likely to include many instances of at least some of the described components. For example, the content-modification system 100 is likely to include many content-distribution systems and many content-presentation devices.

B. Computing System

Figure 2:
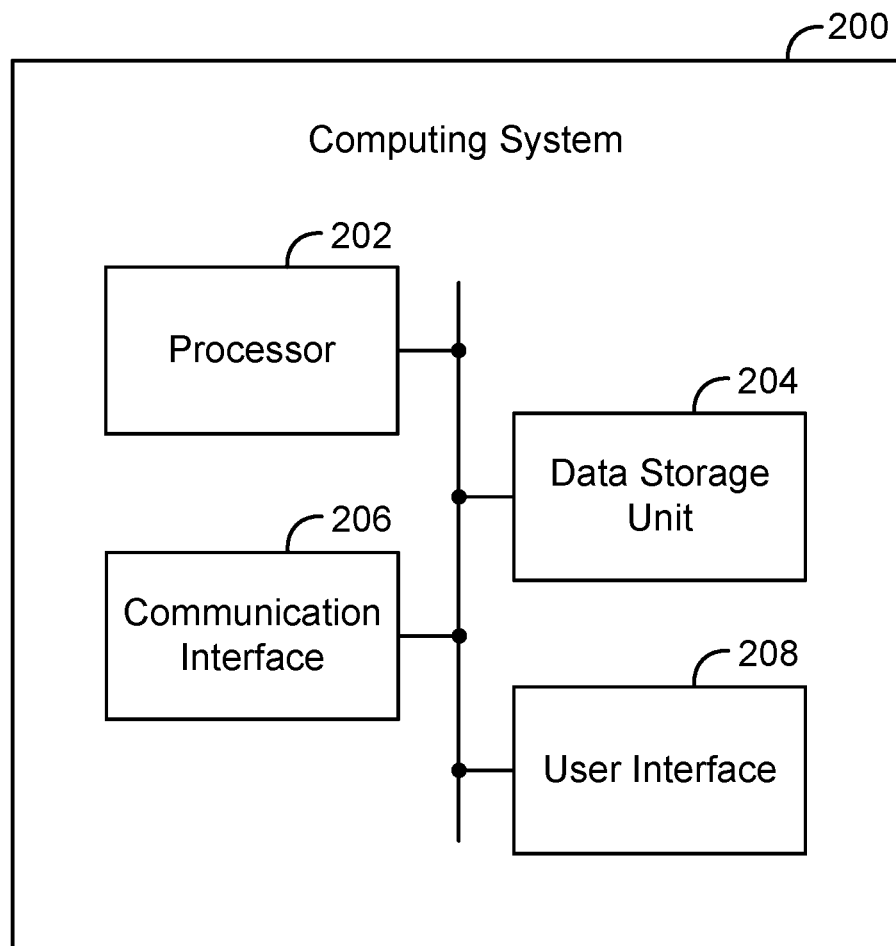
FIG. 2 is a simplified block diagram of an example computing system in which various described principles can be implemented.

FIG. 2 is a simplified block diagram of an example computing system 200. The computing system 200 can be configured to perform and/or can perform one or more operations, such as the operations described in this disclosure. The computing system 200 can include various components, such as a processor 202, a data-storage unit 204, a communication interface 206, and/or a user interface 208.

The processor 202 can be or include a general-purpose processor (e.g., a microprocessor) and/or a special-purpose processor (e.g., a digital signal processor). The processor 202 can execute program instructions included in the data-storage unit 204 as described below.

The data-storage unit 204 can be or include one or more volatile, non-volatile, removable, and/or non-removable storage components, such as magnetic, optical, and/or flash storage, and/or can be integrated in whole or in part with the processor 202. Further, the data-storage unit 204 can be or include a non-transitory computer-readable storage medium, having stored thereon program instructions (e.g., compiled or non-compiled program logic and/or machine code) that, upon execution by the processor 202, cause the computing system 200 and/or another computing system to perform one or more operations, such as the operations described in this disclosure. These program instructions can define, and/or be part of, a discrete software application.

In some instances, the computing system 200 can execute program instructions in response to receiving an input, such as an input received via the communication interface 206 and/or the user interface 208. The data-storage unit 204 can also store other data, such as any of the data described in this disclosure.

The communication interface 206 can allow the computing system 200 to connect with and/or communicate with another entity according to one or more protocols. Therefore, the computing system 200 can transmit data to, and/or receive data from, one or more other entities according to one or more protocols. In one example, the communication interface 206 can be or include a wired interface, such as an Ethernet interface or a High-Definition Multimedia Interface (HDMI). In another example, the communication interface 206 can be or include a wireless interface, such as a cellular or WI-FI interface.

The user interface 208 can allow for interaction between the computing system 200 and a user of the computing system 200. As such, the user interface 208 can be or include an input component such as a keyboard, a mouse, a remote controller, a microphone, and/or a touch-sensitive panel. The user interface 208 can also be or include an output component such as a display device (which, for example, can be combined with a touch-sensitive panel) and/or a sound speaker.

The computing system 200 can also include one or more connection mechanisms that connect various components within the computing system 200. For example, the computing system 200 can include the connection mechanisms represented by lines that connect components of the computing system 200, as shown in FIG. 2.

The computing system 200 can include one or more of the above-described components and can be configured or arranged in various ways. For example, the computing system 200 can be configured as a server and/or a client (or perhaps a cluster of servers and/or a cluster of clients) operating in one or more server-client type arrangements, for instance.

As noted above, the content-modification system 100 and/or components thereof can take the form of a computing system, such as the computing system 200. In some cases, some or all these entities can take the form of a more specific type of computing system. For instance, in the case of the content-presentation device 104, it can take the form of a desktop computer, a laptop, a tablet, a mobile phone, a television set, a set-top box, a television set with an integrated set-top box, a media dongle, or a television set with a media dongle connected to it, among other possibilities.

III. Example Operations

The content-modification system 100 and/or components thereof can be configured to perform and/or can perform one or more operations. Examples of these operations and related features will now be described.

As noted above, in practice, the content-modification system 100 is likely to include many instances of at least some of the described components. Likewise, in practice, it is likely that at least some of described operations will be performed many times (perhaps on a routine basis and/or in connection with additional instances of the described components).

A. Operations Related to the Content-Distribution System Transmitting Content and the Content-Presenting Device Receiving and Outputting Content For context, general operations and examples related to the content-distribution system 102 transmitting content and the content-presentation device 104 receiving and outputting content will now be described.

To begin, the content-distribution system 102 can transmit content (e.g., that it received from a content provider) to one or more entities such as the content-presentation device 104. Content can be or include audio content and/or video content, for example. In some examples, content can take the form of a linear sequence of content segments (e.g., program segments and advertisement segments) or a portion thereof. In the case of video content, a portion of the video content may be one or more frames, for example.

The content-distribution system 102 can transmit content on one or more channels (sometimes referred to as stations or feeds). As such, the content-distribution system 102 can be associated with a single channel content distributor or a multi-channel content distributor such as a multi-channel video program distributor (MVPD).

The content-distribution system 102 and its means of transmission of content on the channel to the content-presentation device 104 can take various forms. By way of example, the content-distribution system 102 can be or include a cable-television head-end that is associated with a cable-television provider and that transmits the content on the channel to the content-presentation device 104 through hybrid fiber/coaxial cable connections. As another example, the content-distribution system 102 can be or include a satellite-television head-end that is associated with a satellite-television provider and that transmits the content on the channel to the content-presentation device 104 through a satellite transmission. As yet another example, the content-distribution system 102 can be or include a television-broadcast station that is associated with a television-broadcast provider and that transmits the content on the channel through a terrestrial over-the-air interface to the content-presentation device 104. In these and other examples, the content-distribution system 102 can transmit the content in the form of an analog or digital broadcast stream representing the content.

The content-presentation device 104 can receive content from one or more entities, such as the content-distribution system 102. In one example, the content-presentation device 104 can select (e.g., by tuning to) a channel from among multiple available channels, perhaps based on input received via a user interface, such that the content-presentation device 104 can receive content on the selected channel.

In some examples, the content-distribution system 102 can transmit content to the content-presentation device 104, which the content-presentation device 104 can receive, and therefore the transmitted content and the received content can be the same. However, in other examples, they can be different, such as where the content-distribution system 102 transmits content to the content-presentation device 104, but the content-presentation device 104 does not receive the content and instead receives different content from a different content-distribution system.

The content-presentation device 104 can also output content for presentation. As noted above, the content-presentation device 104 can take various forms. In one example, in the case where the content-presentation device 104 is a television set (perhaps with an integrated set-top box and/or media dongle), outputting the content for presentation can involve the television set outputting the content via a user interface (e.g., a display device and/or a sound speaker), such that it can be presented to an end-user. As another example, in the case where the content-presentation device 104 is a set-top box or a media dongle, outputting the content for presentation can involve the set-top box or the media dongle outputting the content via a communication interface (e.g., an HDMI interface), such that it can be received by a television set and in turn output by the television set for presentation to an end-user.

As such, in various scenarios, the content-distribution system 102 can transmit content to the content-presentation device 104, which can receive and output the content for presentation to an end-user. In some situations, even though the content-presentation device 104 receives content from the content-distribution system 102, it can be desirable for the content-presentation device 104 to perform a content-modification operation so that the content-presentation device 104 can output for presentation alternative content instead of at least a portion of that received content.

For example, in the case where the content-presentation device 104 receives a linear sequence of content segments that includes a given advertisement segment positioned somewhere within the sequence, it can be desirable for the content-presentation device 104 to replace the given advertisement segment with a different advertisement segment that is perhaps more targeted to the end-user (i.e., more targeted to the end-user's interests, demographics, etc.). As another example, it can be desirable for the content-presentation device 104 to overlay on the given advertisement segment, overlay content that enhances the given advertisement segment in a way that is again perhaps more targeted to the end-user. The described content-modification system 100 can facilitate providing these and other related features.

As noted above, in one example, content can take the form of a linear sequence of content segments. As such, in one example, the content-distribution system 102 can transmit a linear sequence of content segments. This is referred to herein as a "transmission sequence." Likewise, the content-presentation device 104 can receive a linear sequence of content segments. This is referred to herein as a "receipt sequence." In line with the discussion above, the transmission sequence and the receipt sequence can be the same or they can be different.

Figure 3:
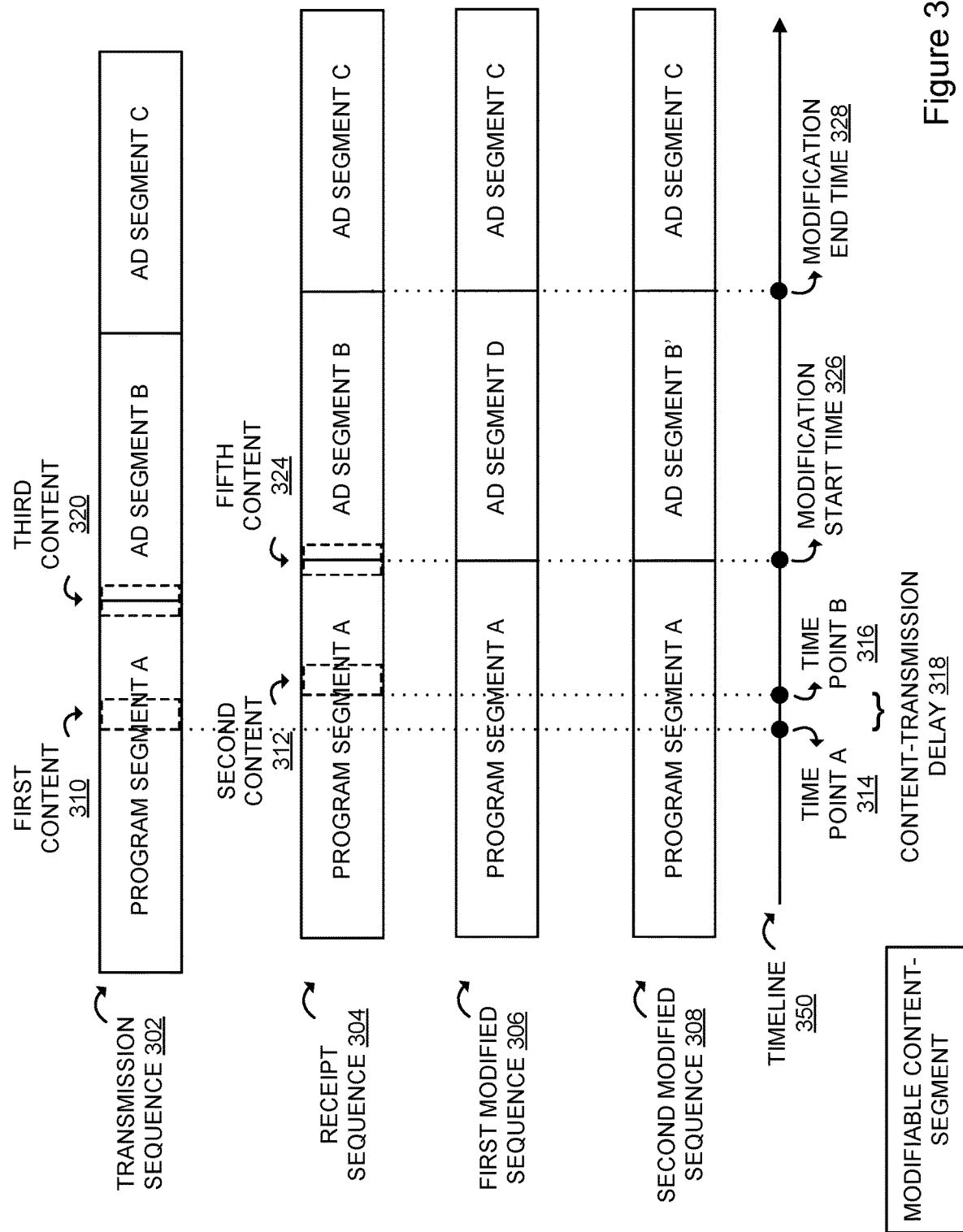
FIG. 3 is a diagram of example linear sequences of content and related concepts.

FIG. 3 illustrates some examples of these concepts. In one example, the transmission sequence is the TRANSMISSION SEQUENCE 302 shown in FIG. 3. As shown, the TRANSMISSION SEQUENCE 302 includes a PROGRAM SEGMENT A, followed by an AD SEGMENT B, followed by an AD SEGMENT C.

Likewise, in one example, the receipt sequence is the RECEIPT SEQUENCE 304 shown in FIG. 3. In this example, the content-distribution system 102 transmits the TRANSMISSION SEQUENCE 302 to the content-presentation device 104, which the content-presentation device 104 receives as the RECEIPT SEQUENCE 304, and therefore the TRANSMISSION SEQUENCE 302 and the RECEIPT SEQUENCE 304 are the same. As such, as shown, the RECEIPT SEQUENCE 304 also includes the PROGRAM SEGMENT A, followed by the AD SEGMENT B, followed by the AD SEGMENT C.

In FIG. 3, the transmission time of the TRANSMISSION SEQUENCE 302 and the receipt time of the RECEIPT SEQUENCE 304 are shown by way of their relationship to a TIMELINE 350. Notably, the transmission time and the receipt time are offset from each other due to a content-transmission delay, which is described in greater detail below.

As noted above, in some situations, even though the content-presentation device 104 receives content from the content-distribution system 102, it can be desirable for the content-presentation device 104 to perform a content-modification operation so that the content-presentation device 104 can output for presentation alternative content instead of at least a portion of that received content. For example, in the case where the content-presentation device 104 receives the receipt sequence, rather than outputting for presentation the receipt sequence, the content-presentation device 104 can output for presentation a modified version of the receipt sequence instead. This is referred to herein as a "modified sequence."

For example, in the case where the receipt sequence includes a given advertisement segment positioned somewhere within the receipt sequence, it can be desirable for the content-presentation device 104 to replace the given advertisement segment with a different advertisement segment that is perhaps more targeted to the end-user (i.e., more targeted to the end-user's interests, demographics, etc.), thereby resulting in a modified sequence that the content-presentation device 104 can output for presentation.

To illustrate this, in one example, the modified sequence is the FIRST MODIFIED SEQUENCE 306 shown in FIG. 3. As shown, the FIRST MODIFIED SEQUENCE 306 includes the PROGRAM SEGMENT A, followed by the AD SEGMENT D (which replaced the AD SEGMENT B), followed by the AD SEGMENT C.

As another example, it can be desirable for the content-presentation device 104 to overlay on the given advertisement segment, overlay content that enhances the given advertisement segment in a way that is again perhaps more targeted to the end-user, thereby resulting in a modified sequence that the content-presentation device 104 can output for presentation.

To illustrate this, in another example, the modified sequence is the SECOND MODIFIED SEQUENCE 308 shown in FIG. 3. As shown, the SECOND MODIFIED SEQUENCE 308 includes the PROGRAM SEGMENT A, followed by the AD SEGMENT B' (which is the AD SEGMENT B modified with overlay content), followed by the AD SEGMENT C.

Other portions of FIG. 3 will be described later in this disclosure as related concepts are introduced and described.

Moving on in view of the context provided above, FIGS. 4A, 4B, 4C, 4D, 4E, and 4F, collectively make up a table showing example time-periods and corresponding operations that can be performed in connection with the content-modification system 100. These and other related operations will now be described.

B. Operations Related to the Content-Distribution System Transmitting First Content on a Channel During a time-period T1, the content-distribution system 102 can transmit content on a channel to the content-presentation device 104. This content is referred to herein as "first content." In one example, the first content is the FIRST CONTENT 310 shown in FIG. 3.

During a time-period T2, the content-distribution system 102 can generate fingerprint data representing the first content. This fingerprint data is referred to herein as "first fingerprint data." The content-distribution system 102 can generate the first fingerprint data using any content fingerprinting process now known or later developed. An example fingerprint generation technique is described in U.S. Pat. No. 9,495,451 issued Nov. 15, 2016, the entirety of which is hereby incorporated by reference herein. The content-distribution system 102 can generate first fingerprint data at a given rate, such as at the rate of one fingerprint per frame of the first content. The first fingerprint data can be or include some or all of these generated fingerprints.

The content-distribution system 102 can access the first content at various points within the content-distribution system 102. As one example, the content-distribution system 102 can access the first content after it is output by a distribution amplifier within the content-distribution system 102.

Also during the time-period T2, the content-distribution system 102 can generate metadata associated with the first content and/or the first fingerprint data. This metadata is referred to herein as "first metadata." In one example, the first metadata can be or include a transmission time-stamp, which represents a time-point at which the content-distribution system 102 transmitted the first content. The content-distribution system 102 can determine the transmission time-stamp in various ways, such as based on a time clock that is synchronized to a reference clock.

As another example, the first metadata can be or include a channel identifier, which identifies the channel on which the content-distribution system 102 is transmitting the first content. The content-distribution system 102 can determine the channel identifier in various ways such as based on mapping data that maps the content-distribution system 102 and/or physical inputs and/or outputs within the content-distribution system 102 to respective channel identifiers. In one example, in the case where the content-distribution system 102 transmits content A on channel A, content B on channel B, and content C on channel C, the mapping data can specify which of three different outputs (perhaps on three different distribution amplifiers) maps to which channel identifier, such that the content-distribution system 102 can determine the appropriate channel identifier for content of a given channel.

As another example, the first metadata can be or include SCTE-104 data, a watermark, or a similar type of metadata, any of which can themselves encode other metadata, such as a program identifier, an advertisement identifier (e.g., an industry standard coding identification (ISCI) key), a program genre, or another type of textual or numeric metadata, for instance.

The content-distribution system 102 can associate the first fingerprint data with the first metadata in various ways. For instance, in the case where the first fingerprint data includes multiple fingerprints with each fingerprint representing a corresponding frame of the first content, the content-distribution system 102 can associate each fingerprint with a corresponding transmission time-stamp and/or with other corresponding first metadata.

During a time-period T3, the content-distribution system 102 can transmit the first fingerprint data and the first metadata to the fingerprint-matching server 106. The content-distribution system 102 can transmit the first fingerprint data and the first metadata at a given interval. For example, every two seconds, the content-distribution system 102 can transmit the first fingerprint data and the first metadata that it generated during that most recent two-second time-period.

C. Operations Related to the Content-Presentation Device Receiving Second Content During a time-period T4, the content-presentation device 104 can receive content from the content-distribution system 102. This content is referred to herein as "second content." In one example, the second content is the SECOND CONTENT 312 shown in FIG. 3.

During a time-period T5, the content-presentation device 104 can generate fingerprint data representing the second content. This fingerprint data is referred to herein as "second fingerprint data." The content-presentation device 104 can generate the second fingerprint data using any content fingerprinting process now known or later developed. The content-presentation device 104 can generate the second fingerprint data at various rates, such as at the rate of one fingerprint per frame of the second content. The second fingerprint data can be or include some or all of these generated fingerprints.

The content-presentation device 104 can access the second content at various points within the content-presentation device 104. As one example, the content-presentation device 104 can access the second content as it is being received by an input buffer (e.g., an HDMI buffer) of the content-presentation device 104. In another configuration, the content-presentation device 104 can access the second content as it is being received by a display buffer of the content-presentation device 104. In this configuration, the second content can therefore be content that the content-presentation device 104 not only receives, but also outputs for presentation.

Also during the time-period T5, the content-presentation device 104 can generate metadata associated with the second content and/or the second fingerprint data. This metadata is referred to herein as "second metadata." As one example, the second metadata can be or include a receipt time-stamp, which represents a time-point at which the content-presentation device 104 received the second content. The content-presentation device 104 can determine the receipt time-stamp in various ways, such as based on a time clock that is synchronized to a reference clock. As noted above, the content-presentation device 104 can access the second content at various points within the content-presentation device 104. In one example, the point at which the second content is accessed can be considered the "receipt" point for purposes of determining the receipt time-stamp.

In practice, while the first metadata is likely to be or include a channel identifier, the second metadata is likely to not be nor include a channel identifier.

The content-presentation device 104 can associate the second fingerprint data with the second metadata in various ways. For instance, where the second fingerprint data includes multiple fingerprints with each fingerprint representing a corresponding frame of second content, the content-presentation device 104 can associate each second fingerprint with a corresponding receipt time-stamp and/or other corresponding metadata.

During a time-period T6, the content-presentation device 104 can transmit the second fingerprint data and the second metadata to the fingerprint-matching server 106. The content-presentation device 104 can transmit the second fingerprint data and the second metadata at a given interval. For example, every two seconds, the content-presentation device 104 can transmit the second fingerprint data and the second metadata that it generated during that most recent two-second time-period.

D. Operations Related to Identifying a Channel on which the Content-Presentation Device is Receiving the Second Content During a time-period T7, the fingerprint-matching server 106 can receive the first fingerprint data and the first metadata from the content-distribution system 102. As noted above, the first fingerprint data represents the first content transmitted by the content-distribution system 102 on the channel. As noted above, the first metadata can, and for the purposes of this described example does, identify the channel. In this way, the first content can be considered as content being transmitted on an identified channel.

During a time-period T8, the fingerprint-matching server 106 can receive the second fingerprint data and the second metadata from the content-presentation device 104. As noted above, the second fingerprint data represents the second content received by the content-presentation device 104. However, as noted above, the associated metadata may not, and for the purposes of this described example does not, identify the channel. In this way, the second content can be considered as content being received on an unidentified channel.

During a time-period T9, the fingerprint-matching server 106 can compare the first fingerprint data and the second fingerprint data to determine whether there is a match. In this disclosure, this type of match attempt, namely a match attempt between (i) reference fingerprint data representing content being transmitted on an identified channel and (ii) query fingerprint data representing content being received on an unidentified channel, is referred to herein as a "cold match attempt."

During a time-period T10, based on the comparing, the fingerprint-matching server 106 can detect a match between the first fingerprint data and the second fingerprint data. The fingerprint-matching server 106 can compare and/or detect a match between fingerprint data using any content fingerprint comparing and matching technique now known or later developed. An example fingerprint comparing and matching technique is described in U.S. Pat. No. 9,146,990 issued Sep. 29, 2015, the entirety of which is hereby incorporated by reference herein.

To effectively compare the first fingerprint data and the second fingerprint data, the fingerprint-matching server 106 may need to account for a content-transmission delay. For context, in the case where the content-distribution system 102 transmits a given frame of content on a given channel at a time-point A, for various reasons, the content-presentation device 104 may not receive that frame until a time-point B that is later (e.g., ten seconds later) than the time-point A. This type of delay is referred to herein as a "content-transmission delay."

In one example, the time-point A, the time-point B, and the content-transmission delay can be the TIME-POINT A 314, the TIME-POINT B 316, and the CONTENT-TRANSMISSION DELAY 318, respectively, shown FIG. 3. Note that FIG. 3 is for illustration purposes and is not necessarily to scale at least with respect to time. In practice, the actual amount of content-transmission delay may be different from the amount shown.

To help the fingerprint-matching server 106 effectively compare the first fingerprint data with the second fingerprint data, the fingerprint-matching server 106 may need to account for such a content-transmission delay. In one example, the fingerprint-matching server 106 can do this by comparing the first fingerprint data that it receives at a receipt time-point with the second fingerprint data that it receives during a time-period defined by a starting time-point and an ending time-point. The starting time-point can be the receipt time-point plus an offset representing an anticipated content-transmission delay (e.g., ten seconds), minus a tolerance a time-period (e.g., two seconds). The ending time-point can be the receipt time-point plus the offset (e.g., ten seconds), plus the tolerance a time-period (e.g., two seconds). As such, in one example where the anticipated content-transmission delay is 10 seconds, the fingerprint-matching server 106 can compare first fingerprint data that it receives at a receipt time-point with second fingerprint data that it receives during a time-period between (i) the receipt time-point plus eight seconds and (ii) receipt time-point plus twelve seconds.

In some cases, the fingerprint-matching server 106 can determine a content-transmission delay, which it can use to select an appropriate offset for use in determining the starting and ending time-points, as described above. The fingerprint-matching server 106 can determine the content-transmission delay in various ways. For example, after the fingerprint-matching server 106 detects a match based on a cold match attempt, the fingerprint-matching server 106 can determine the content-transmission delay as a difference between the corresponding transmission time-stamp (of the first metadata) and the corresponding receipt time-stamp (of the second metadata), for example. Notably, the content-transmission delay can vary from channel to channel.

During a time-period T11, based on the detected match, the fingerprint-matching server 106 can identify the channel on which the second content is being received by the content-presentation device 104. In one example, the fingerprint-matching server 106 can identify the channel based on the channel identifier metadata associated with the first fingerprint data used to detect the match.

Notably, in practice, since there are likely to be multiple potential channels on which the content-presentation device 104 is receiving the second content, the fingerprint-matching server 106 is likely to compare the second fingerprint data with multiple instances of first fingerprint data (each representing a different respective instance of first content on a different respective channel), to determine which of those multiple instances matches the second fingerprint data.

Also, in some cases, the fingerprint-matching server 106 can detect a match between the second fingerprint data and each of multiple instances of first fingerprint data (each representing a different respective instance of first content on a different respective channel). This is referred to herein as a "multimatch scenario" and can occur for various reasons. For example, this can occur when the content-distribution system 102 is transmitting the same or similar content on more than one channel at or about the same time. In this scenario, the fingerprint-matching server 106 can perform additional operations to identity, from among the multiple channels associated with the multimatch scenario, on which specific channel the content-presentation device 104 is receiving the second content. The fingerprint-matching server 106 can do this using any channel multimatch disambiguation technique now known or later developed. An example channel multimatch disambiguation technique is described in U.S. Pat. No. 9,992,533 issued Jun. 5, 2018, the entirety of which is hereby incorporated by reference herein.

E. Operations Related to Determining Historical Content Consumption Data

During a time-period T12, the fingerprint-matching server 106 can generate metadata associated with the identified channel. For example, the metadata can be or include a channel identification time-stamp. The fingerprint-matching server 106 can determine the channel identification time-stamp in various ways, such as based on a time clock that is synchronized to a reference clock. In another example, the metadata can be or include a device identifier that identifies the content-presentation device 104 that is receiving content on the identified channel. The fingerprint-matching server 106 can determine the device identifier in various ways, such as by receiving it from the content-presentation device 104. In another example, the fingerprint-matching server 106 can receive data (e.g., device registration data) from the content-presentation device 104 and can use mapping data to map the received data to determine the device identifier.

During a time-period T13, the fingerprint-matching server 106 can transmit an indication of the identified channel and the associated metadata to the data-management system 110.

During a time-period T14, the data-management system 110 can receive the indication of the identified channel and the associated metadata from the fingerprint-matching server 106.

The data-management system 110 can use the received indication of the identified channel and the associated metadata, perhaps with other data, to determine when the content-presentation device 104 has received content on the identified channel, what specific content the content-presentation device 104 has received, etc. This type of data is referred to herein as "historical content consumption data."

As such, during a time-period T15, the data-management system 110 can determine historical content consumption data associated with the content-presentation device 104.

F. Operations Related to the Content-Distribution System Transmitting Third Content As noted above, the fingerprint-matching server 106 can identify the channel on which the content-presentation device 104 is receiving the second content.

During a time-period T16, the content-distribution system 102 can transmit content on the identified channel to the content-presentation device 104. This content is referred to herein as "third content." In one example, the third content is the THIRD CONTENT 320 shown in FIG. 3. In practice, the content-distribution system 102 is likely to transmit the third content shortly after (e.g., immediately after or a few seconds or minutes after) transmitting the first content.

During a time-period T17, the content-distribution system 102 can generate fingerprint data representing the third content. This fingerprint data is referred to herein as "third fingerprint data."

Also during the time-period T17, the content-distribution system 102 can generate metadata associated with the third content and/or the third fingerprint data. This metadata is referred to herein as "third metadata." The content-distribution system 102 can also associate the third fingerprint data with the third metadata.

During a time-period T18, the content-distribution system 102 can transmit the third fingerprint data and the third metadata to the fingerprint-matching server 106.

The content-distribution system 102 can transmit the third content, generate the third fingerprint data, generate the third metadata, associate the third fingerprint data with the third metadata, and transmit the third fingerprint data and the third metadata in various ways, such as ways that are the same as or similar to those described above in connection with transmitting the first content, generating the first fingerprint data, generating the first metadata, associating the first fingerprint data with the first metadata, and transmitting the first fingerprint data and the first metadata.

G. Operations Related to the Content-Management System Receiving a Modifiable Content-Segment During a time-period T19, the content-management system 108 can receive content in the form of a content segment that has been identified as a candidate to be modified. This content is referred to herein as a "modifiable content-segment" or "fourth content." In one example, the modifiable content-segment is the MODIFIABLE CONTENT-SEGMENT shown in FIG. 3.

The modifiable content-segment can take various forms. For example, the modifiable content-segment can be an advertisement segment (e.g., a commercial) or a program segment. As such, in one example, the modifiable content-segment can be an advertisement segment that has been identified as a candidate to be modified, perhaps by way of being replaced with a different advertisement segment, and/or by way of having content overlaid thereon.

In one example, a user, perhaps associated with the content-distribution system 102, can facilitate uploading the modifiable content-segment to the content-management system 108, such that the content-management system 108 can receive it in this way.

During a time-period T20, the content-management system 108 can generate fingerprint data representing the modifiable content-segment. This fingerprint data is referred to herein as "fourth fingerprint data." The content-management system 108 can generate the fourth fingerprint data using any fingerprint generation technique now known or later developed. The content-management system 108 can generate the fourth fingerprint data at a given rate, such as at the rate of one fingerprint per frame of the fourth content. The fourth fingerprint data can be or include some or all of these generated fingerprints.

Also during the time-period T20, the content-management system 108 can generate metadata associated with the modifiable content-segment and/or the fourth fingerprint data. This metadata is referred to herein as "fourth metadata." As one example, the fourth metadata can be or include a duration of the modifiable content-segment. The content-management system 108 can determine the duration in various ways, such as based on the fingerprint generation process. For example, in the case where the content-management system 108 generating the fourth fingerprint data involves generating one fingerprint per frame, where the modifiable content-segment has a frame rate of 30 frames per second, and where the fingerprinting process results in 300 fingerprints being generated, the content-management system 108 can deduce that the modifiable content-segment has a duration of ten seconds. The metadata can also be or include other information about the modifiable content-segment, such as a content segment identifier, a title, and/or specifics about permissible ways in which the modifiable content-segment can be modified, etc.

During a time-period T21, the content-management system 108 can transmit the fourth fingerprint data and the fourth metadata to the fingerprint-matching server 106.

In practice, the content-management system 108 is likely to receive many modifiable content-segments. In such situations, the content-management system 108 can perform one or more of the operations described above, as appropriate for each of the many received modifiable content-segments. As such, the content-management system 108 can transmit many instances of fourth fingerprint data, each corresponding with a different respective modifiable content-segment, to the fingerprint-matching server 106.

H. Operations Related to the Fingerprint-Matching Server Identifying an Upcoming Content-Modification Opportunity on the Identified Channel During a time-period T22, the fingerprint-matching server 106 can receive the third fingerprint data and the third metadata from the content-distribution system 102. As noted above, the third fingerprint data represents the third content transmitted by the content-distribution system 102 on the identified channel.

During a time-period T23, the fingerprint-matching server 106 can receive the fourth fingerprint data and the fourth metadata from the content-management system 108. As noted above, the fourth fingerprint data represents the modifiable content-segment.

During a time-period T24, the fingerprint-matching server 106 can compare at least a portion of the third fingerprint data with at least a portion of the fourth fingerprint data to determine whether there is a match.

During a time-period T25, based on the comparing, the fingerprint-matching server 106 can detect a match between the at least a portion of the third fingerprint data and the at least a portion of the fourth fingerprint data. The fingerprint-matching server 106 can compare and/or detect a match between fingerprint data using any content fingerprint comparing and matching process now known or later developed.

During a time-period T26, based on the detected match, the fingerprint-matching server 106 can determine that at least a portion of the modifiable content-segment is included within the third content, and therefore can identify an upcoming content-modification opportunity on the identified channel. For example, the fingerprint-matching server 106 can determine that at least a beginning portion of the MODIFIABLE CONTENT-SEGMENT is included within the THIRD CONTENT 320, as shown in FIG. 3, and therefore can identify an upcoming content-modification opportunity.

As noted above, the fingerprint-matching server 106 can receive third metadata, which can be the same as or similar to the first metadata. As such, the third metadata can be or include a transmission time-stamp and/or a channel identifier, for example. However, the third metadata can also be or include a position of at least a portion of the modifiable content-segment within the third content. In one example, the metadata can specify this using a starting frame marker and an ending frame marker, each corresponding with a respective frame of the third content. The fingerprint-matching server 106 can determine the starting frame marker and the ending frame marker based on the matching.

Notably, in practice, since there are likely to be multiple potential modifiable content-segments where portions thereof could be included within the third content, the fingerprint-matching server 106 is likely to compare at least a portion of the third fingerprint data with at least a portion of multiple instances of fourth fingerprint data (each representing a different respective instance of a modifiable content-segment), to determine which of those multiple instances of the fourth fingerprint data has a portion that matches the at least a portion of the third fingerprint data.

I. Operations Related to Preparing the Content-Presentation Device to Perform a Content-Modification Operation in Connection with the Identified Upcoming Content-Modification Opportunity During a time-period T27, based on the detected match, the fingerprint-matching server 106 can transmit the third fingerprint data and the third metadata to the content-presentation device 104 data to facilitate preparing the content-presentation device 104 to perform a content-modification operation in connection with the identified upcoming content-modification opportunity.

During a time-period T28, the content-presentation device 104 can receive the third fingerprint data and the third metadata from the fingerprint-matching server 106.

During a time-period T29, the content-presentation device 104 can receive content on the identified channel. This content is referred to herein as "fifth content." In one example, the fifth content is the FIFTH CONTENT 324 shown in FIG. 3.

For various reasons (e.g., due to a transmission delay associated with transmitting fingerprint data and metadata being shorter that the content-transmission delay), the content-presentation device 104 can receive the third fingerprint data and the third metadata from the fingerprint-matching server 106 before receiving the fifth content from the content-distribution system 102. In this way, the content-presentation device 104 can receive fingerprint data representing content that the content-presentation device 104 is expecting to receive shortly thereafter, and that the content-presentation device should actually receive shortly thereafter unless an interruption event (e.g., a channel-change event) occurs.

In practice, similar to how the content-distribution system 102 is likely to transmit the third content shortly after (e.g., immediately after or a few seconds or minutes after) transmitting the first content, the content-presentation device 104 is likely to receive the fifth content shortly after (e.g., immediately after or a few seconds or minutes after) receiving the second content.

During a time-period T30, the content-presentation device 104 can output for presentation at least a portion of the fifth content. For example, referring to FIG. 3, the content-presentation device can output for presentation the portion of the FIFTH CONTENT 324 that is the end portion of the PROGRAM SEGMENT A.

As noted above, in some situations, even though the content-presentation device 104 receives content from the content-distribution system 102, it can be desirable for the content-presentation device 104 to perform a content-modification operation so that the content-presentation device 104 can output for presentation alternative content instead of at least a portion of the received content.

As such, even though the content-presentation device 104 receives the fifth content and outputs for presentation at least a portion of the fifth content, it can be desirable for the content-presentation device 104 to perform a content-modification operation so that the content-presentation device 104 can also output for presentation alternative content instead of at least another portion (e.g., the remaining portion) of the fifth content. For example, referring to FIG. 3, it can be desirable for the content-presentation device 104 to replace at least a portion of the AD SEGMENT B with at least a portion of a different advertisement segment that is perhaps more targeted to the end-user. As another example, it can be desirable for the content-presentation device 104 to overlay on at least a portion of the AD SEGMENT B, overlay content that enhances at least a portion of the AD SEGMENT B in a way that is again perhaps more targeted to the end-user.

During a time-period T31, the content-presentation device 104 can generate fingerprint data representing the fifth content. This fingerprint data is referred to herein as "fifth fingerprint data." The content-presentation device 104 can generate the fifth fingerprint data using any content fingerprinting process now known or later developed. The content-presentation device 104 can generate the fifth fingerprint data at various rates, such as at the rate of one fingerprint per frame of the fifth content. The fifth fingerprint data can be or include some or all of these generated fingerprints.

Also during the time-period T31, the content-presentation device 104 can generate metadata associated with the fifth content and/or the fifth fingerprint data. This metadata is referred to herein as "fifth metadata."

The content-presentation device 104 can receive the fifth content, generate the fifth fingerprint data, generate the fifth metadata, associate the fifth fingerprint data with the fifth metadata in various ways, such as ways that are the same as or similar to those described above in connection with receiving the second content, generating the second fingerprint data, generating the second metadata, and associating the second fingerprint data with the second metadata.

As noted above, the content-presentation device 104 can receive the third fingerprint data from the fingerprint-matching server 106 and can generate the fifth fingerprint data.

During a time-period T32, the content-presentation device 104 can compare the third fingerprint data and the fifth fingerprint data to determine whether there is a match.

During a time-period T33, based on the comparing, the content-presentation device 104 can detect a match between the third fingerprint data and the fifth fingerprint data. In this disclosure, this type of match attempt, namely a match attempt between (i) reference fingerprint data representing content transmitted by the content-distribution system 102 on an identified channel (at least based on the most recent channel identification analysis), and (ii) query fingerprint data representing content being received by the content-presentation device 104 on the same identified channel, is referred to herein as a "hot match attempt." The content-presentation device 104 can compare and/or detect a match between fingerprint data using any content fingerprint comparing and matching process now known or later developed.

During a time-period T34, based on the detected match, the content-presentation device 104 can determine a time-point at which the identified upcoming modification opportunity starts. This is referred to herein as the "modification start-time." In one example, the modification start-time is the MODIFICATION START-TIME 326 as shown FIG. 3.

In one example, the content-presentation device 104 can determine the modification start-time by starting with the transmission time-stamp associated with the starting frame marker (which, as described above, can be or be included in the third metadata) and adding the content-transmission delay to that transmission time-stamp, to arrive at the modification start-time.

As another example, the content-presentation device 104 can determine the modification start-time by first establishing a synchronous lock between the third content, the third fingerprint data, and/or the third metadata on the one hand, and the fifth content, the fifth fingerprint data, and/or the fifth metadata, on the other hand. The content-presentation device 104 can establish the synchronous lock using any synchronous lock technique now known or later developed. An example synchronous lock technique is described in U.S. Pat. No. 10,506,275 issued Dec. 10, 2019, the entirety of which is hereby incorporated by reference herein. Another example synchronous lock technique is described in U.S. Pat. App. Pub. No. 2020/0029108 published Jan. 23, 2020, the entirety of which is hereby incorporated by reference herein.

The content-presentation device 104 can then determine the modification start-time by determining a time-period between (i) a current receipt time-stamp associated with a first portion of the fifth content that the content-presentation device 104 is currently receiving and (ii) based on the synchronous lock, an anticipated receipt time-stamp associated with a second portion of the fifth content that is the start of the modifiable content-segment, and then adding the determined time-period to the current receipt time-stamp, to arrive at the modification start-time.

Also during the time-period T34, based on the detected match, the content-presentation device 104 can determine a time-point at which the identified upcoming modification opportunity ends. This is referred to herein as the "modification end-time." In one example, the modification end-time is the MODIFICATION END-TIME 328 as shown FIG. 3.

In one example, the content-presentation device 104 can determine the modification end-time by starting with the modification start-time and adding the duration of the modifiable content-segment (which, as described above, can be or be included in the fourth metadata) to the modification start-time, to arrive at the modification end-time.

Notably, if the content-presentation device 104 performs a hot match attempt and does not detect a match, the content-presentation device 104 can determine that the content-presentation device 104 is no longer receiving content on the most recently identified channel. In response, the content-presentation device 104 can repeat one or more of the operations described above so that the fingerprint-matching server 106 can perform another cold match attempt, to attempt to identify the channel again.

During a time-period T35, the content-presentation device 104 can transmit a request for content for use in connection with performing the content-modification operation, to the content-management system 108. This content is referred to herein as "supplemental content." In one example, the content-presentation device 104 can transmit the request before the modification start-time (e.g., ten seconds before). In some cases, the request can include selection criteria for the supplemental content, which the content-presentation device 104 can determine based on the third metadata that the content-presentation device 104 receives from the fingerprint-matching server 106, for instance.

For example, the selection criteria can specify a requested type of content (e.g., a replacement content segment or overlay content), duration (e.g., 15 seconds, 30 seconds, or 60 seconds), aspect ratio (e.g., 4:3 or 16:9), and/or resolution (e.g., 720p or 1080p).

During a time-period T36, the content-management system 108 can receive the request and use it as a basis to select supplemental content from among multiple supplemental content items that are available for selection. In some cases, the content-management system 108 can receive and consider various data to help inform which supplemental content to select. For example, the content-management system 108 can receive historical content consumption data for the content-presentation device 104 from the data-management system 110 and/or the content-management system 108 can receive demographic data from a demographic data provider. The content-management system 108 can then use at least the received historical content consumption data and/or the received demographic data as a basis to select the supplemental content.

The content-management system 108 can cause the selected supplemental content to be transmitted to the content-presentation device 104. In one example, the content-management system 108 can do this by communicating with a supplemental-content delivery system 112 that can host the supplemental content. The supplemental-content delivery system 112 can take various forms and can include various components, such as a content distribution network (CDN).

During a time-period T37, the content-management system 108 can transmit a request for a link (e.g., a Uniform Resource Identifier (URI) or a Uniform Resource Locator (URL)) pointing to the hosted supplemental content, to the supplemental-content delivery system 112.

During a time-period T38, the supplemental-content delivery system 112 can receive and respond to the request for the link by transmitting the requested link to the content-management system 108.

During a time-period T39, the content-management system 108 can then in turn transmit the link to the content-presentation device 104.

During a time-period T40, the content-presentation device 104 can receive the link, which it can use to retrieve the supplemental content from the supplemental-content delivery system 112, such that the content-presentation device 104 can use the retrieved supplemental content in connection with performing the content-modification operation. In one example, the content-presentation device 104 can retrieve the supplemental content and store the supplemental content in a data-storage unit of the content-presentation device 104.

As such, in some examples, the content-presentation device 104 can receive the modifiable content-segment from one source (e.g., the content-distribution system 102), and the supplemental content from another source (e.g., the supplemental-content delivery system 112). These segments can be transmitted to, and received by, the content-presentation device 104 in different ways. For example, the content-distribution system 102 can transmit, and the content-presentation device 104 can receive, the modifiable content-segment as a broadcast stream transmission, whereas the supplemental-content delivery system 112 can transmit, and the content-presentation device 104 can receive, the supplemental content as an over-the-top (OTT) transmission. In this context, in one example, the content-distribution system 102 can receive the modifiable content-segment via one communication interface (e.g., an HDMI interface), and the content-presentation device 104 can receive the supplemental content via a different communication interface (e.g., an Ethernet or WI-FI interface).

J. Operations Related to the Content-Presentation Device Performing a Content-Modification Operation At a time-period T41, the content-presentation device 104 can perform the content-modification operation. The content-presentation device 104 can do this in various ways, perhaps depending on the type of content-modification operation to be performed.

In one example, the content-presentation device 104 performing a content-modification operation can involve the content-presentation device 104 modifying the modifiable content-segment by replacing it with supplemental content. This is referred to herein as a "content-replacement operation." For example, in this scenario, the content-presentation device 104 can receive a linear sequence of content segments that includes the modifiable content-segment and the associated metadata, and can also receive the supplemental content segment, as described above. The content-presentation device 104 can output for presentation the sequence of content segments up until the modification start-time (which corresponds to the start of the modifiable content-segment), at which time the content-presentation device 104 can switch to outputting for presentation the supplemental content instead. Then, at the modification end-time (which corresponds to the end of the modifiable content-segment), the content-presentation device 104 can switch back to outputting for presentation the content that follows in the linear sequence of content segments (or perhaps to other content, such as additional supplemental content that is replacing another modifiable content-segment).

In one example, the operation of the content-presentation device 104 switching from outputting the sequence of content segments to outputting the supplemental content can involve using various buffers of the content-presentation device 104. For example, this can involve the content-presentation device 104 switching from using first data in a first input buffer where the sequence of content segments is being received to using second data in a second input buffer where the supplemental content is being received, to populate a display buffer.

As such, according to one example as illustrated in FIG. 3, by performing a content replacement operation, the content-presentation device 104 can replace the AD SEGMENT B with the AD SEGMENT D. As a result, rather than outputting for presentation the RECEIPT SEQUENCE 304, the content-presentation device can instead output for presentation the FIRST MODIFIED SEQUENCE 306.

In another example, the content-presentation device 104 performing a content-modification operation can involve the content-presentation device 104 modifying a modifiable content-segment by overlaying on the modifiable content-segment, overlay content (referred to herein as a "content overlay operation"). For example, in this scenario, the content-presentation device 104 can again receive a linear sequence of content segments that includes the modifiable content-segment and the associated metadata, and the content-presentation device 104 can also receive the supplemental content, as described above.

The content-presentation device 104 can then output for presentation the modifiable content-segment as it ordinarily would, except that starting at the modification start-time, the content-presentation device 104 can start overlaying the supplemental content on the modifiable content-segment. The content-presentation device 104 can continue overlaying the supplemental content until the modification end-time. In this way, the content-presentation device 104 can overlay the supplemental content during at least some temporal portion of the modifiable content-segment.

In one example, the operation of the content-presentation device 104 overlaying supplemental content on the modifiable content-segment can involve using various buffers of the content-presentation device 104. For example, this can involve the content-presentation device 104 using a portion of first data in a first input buffer where the sequence of content segments is being received together with second data in a second input buffer where the supplemental content is being received, for the purposes of populating a display buffer. In this way, the content-presentation device can combine relevant portions of the modifiable content-segment (i.e., all portions except those representing region where the supplemental content is to be overlaid) together with the supplemental content to be used as an overlay, to create the desired modifiable content-segment plus the supplemental content overlaid thereon.

As such, according to one example as illustrated in FIG. 3, by performing a content overlay operation, the content-presentation device 104 can overlay supplemental content on the AD SEGMENT B, thereby modifying it to AD SEGMENT B'. As a result, rather than outputting for presentation the RECEIPT SEQUENCE 304, the content-presentation device can instead output for presentation the SECOND MODIFIED SEQUENCE 308.

K. Tracking and Reporting Operation-Related Data

To help facilitate performance of various operations such as the content-presentation device 104 performing a content-modification operation and to help allow for the tracking and reporting of such operations, the content-modification system 100 and/or components thereof can track and report various operation-related data at various times and in various ways.

As just a few illustrative examples, responsive to certain operations being performed, such as those described herein, the fingerprint-matching server 106, the content-presentation device 104, and/or another entity can generate, store, and/or transmit messages that indicate (i) that a modifiable content-segment has been identified, (ii) that a channel has been identified/confirmed (perhaps based on a match detected as a result of a cold or hot match attempt), (iii) that an upcoming content-modification opportunity on the identified channel has been identified, (iv) that supplemental content has been requested, (v) that supplemental content has been received, (vi), that a content-modification operation has started, (vii) that a content-modification operation has ended, and/or (viii) that a scheduled content-modification operation was aborted and/or not performed for any given reason. In some cases, these messages can include other metadata related to these operations. For example, the metadata can specify relevant timing information, device identifiers, channel identifiers, content segment identifiers, etc.

L. Watermark-Based Techniques

Although this disclosure has described the content-modification system 100 using fingerprint-based technology to perform various operations and to provide various features, in some examples, the content-modification system 100 can use watermark-based techniques instead of, or in addition to, fingerprint-based techniques, to perform these and other operations and to provide these and other features.

For example, as an alternative to the fingerprint-based technique described above in which the fingerprint-matching server 106 identifies the channel on which the second content is being received by the content-presentation device 104, the content-distribution system 102 or another entity can insert a channel identifier in the form of a watermark into the second content, such that the fingerprint-matching server 106, the content-presentation device 104, or another entity can extract the channel identifier and use it to identify the channel on which the second content is being received by the content-presentation device 104.

In this context, the content-modification system 100 can employ any watermark technique now known or later developed.

M. Additional Operations Related to Performing a Content-Modification Operation

In some situations, the content-management system 108 can use broadcast schedule data to facilitate the content-presentation device 104 performing certain operations. These acts and related features will now be described.

In one example configuration, the content-management system 108 can access broadcast schedule data associated with a channel. In some configurations, this can involve the content-management system 108 accessing an industry standard coding identification (ISCI) key and/or a house identifier. The broadcast schedule data can be or include program log files (e.g., schedules that list when certain advertisements or other content will be broadcast) received from a content provider (e.g., a television programmer). In some examples, the broadcast schedule data can be accessed via a schedule notification interface such as Society of Cable Telecommunications Engineers 224 (SCTE 224) messaging. Further, in some examples, the broadcast schedule data can be accessed via direct integration of elements of the content-modification system 100 with a broadcast playout system associated with a content provider.

The content-management system 108 can use the accessed broadcast schedule data to identify an upcoming content-modification opportunity on the channel. In one example, this can involve the content-management system 108 (i) accessing first broadcast schedule data associated with the channel, (ii) extracting, from among the accessed first broadcast schedule data associated with the channel, second broadcast schedule data related to one or more broadcast-related events scheduled within a predefined upcoming duration, and (iii) using the extracted second broadcast schedule data to identify the upcoming content-modification opportunity on the channel.

In another example, the content-management system 108 using the accessed broadcast schedule data to identify an upcoming content-modification opportunity on the channel can involve the content-management system 108 (i) detecting a match between the accessed broadcast schedule data and reference data that corresponds with a reference modifiable content segment, and (ii) identifying the upcoming content-modification opportunity on the channel based at least in part on the detected match.

Responsive to identifying the upcoming-content-modification opportunity on the channel, the content-management system 108 can identify the content-presentation device 104 tuned to the channel. The content-management system 108 can cause supplemental content to be transmitted to the identified content-presentation device 104, to facilitate the content-presentation device 104 performing a content-modification operation related to the upcoming content-modification opportunity on the channel. The content-management system 108 can also transmit to the identified content-presentation device 104 reference fingerprint data to further facilitate the content-presentation device 104 performing the content-modification operation related to the upcoming content-modification opportunity on the channel.

The content-presentation device 104 can receive the supplemental content and can use the received supplemental content in connection with performing a content-modification operation related to the upcoming content-modification opportunity on the channel.

In practice, these features can be implemented in connection with multiple content presentation devices. In one configuration, responsive to identifying the upcoming content-modification opportunity on the channel, the content-management system 108 can identify a group of multiple content-presentation devices tuned to the channel. For each content-presentation device in the identified group, the content-management system 108 can then cause respective supplemental content to be transmitted to that content-presentation device, to facilitate that content-presentation device performing a respective content-modification operation related to the upcoming content-modification opportunity on the channel. The content-management system 108 (or another entity such as the fingerprint-matching server 106) can also transmit to that content-presentation device respective reference fingerprint data to further facilitate that content-presentation device performing the respective content-modification operation related to the upcoming content-modification opportunity on the channel.

In some instances, the content-presentation device 104 can determine that it did not receive the modifiable-content segment related to the content-modification opportunity, which can happen due to broadcast schedule slippage or because another entity (e.g., a set-top box) already replaced the modifiable-content segment with supplemental content, for instance. The content-presentation device 104 can determine this in various ways (e.g., based on compared fingerprint data). Responsive to detecting this, the content-presentation device 104 can refrain from or stop performing (e.g., abort) the content-modification operation. However, as another option, the content-presentation device 104 can replace this supplemental content with other supplemental content.

N. Content-Modification Operations Performed by a Tuner Device Connected to a Content-Presentation Device In line with the discussion above, when there is an upcoming content-modification opportunity, a content-presentation device can be scheduled to replace a modifiable content-segment with first supplemental content at a modification start-time. However, before the scheduled modification start-time and at the instruction of an MVPD, a tuner device connected to the content-presentation device might replace the modifiable content-segment with second supplemental content, different from the first supplemental content. Thus, the linear sequence of content segments that the content-presentation device receives from the tuner device can include the second supplemental content instead of the modifiable content-segment that the content-presentation device is expecting to receive.

Figure 5:
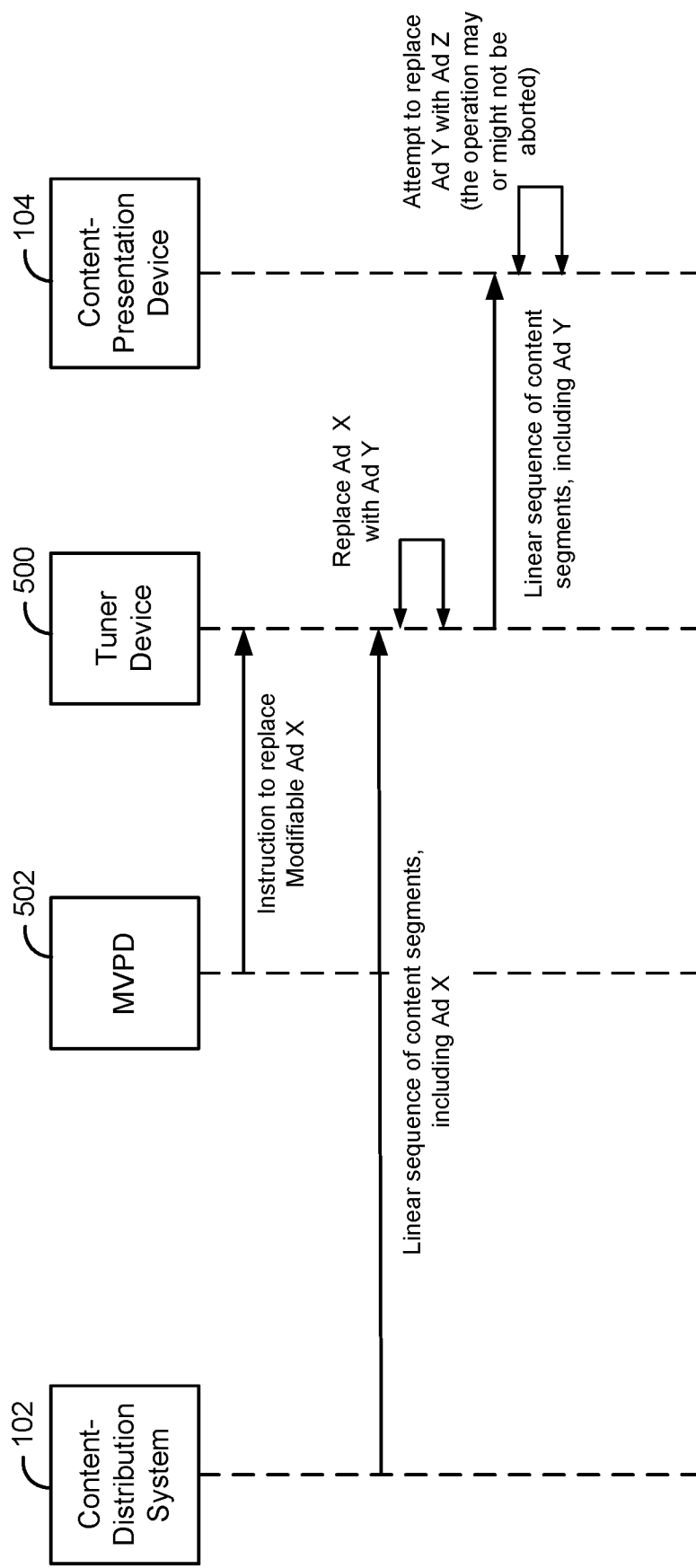
FIG. 5 is a sequence diagram of operations that can be performed when a tuner device performs a content-modification operation at the request of a content distributor.

FIG. 5 is a sequence diagram depicting an example of this situation. The tuner device 500 can receive an instruction from MVPD 502 to replace an upcoming Modifiable Advertisement X, and can carry out the replacement (e.g., with Advertisement Y) upon receipt of a linear sequence of content segments (including Modifiable Advertisement X) from the content-distribution system 102. The content-presentation device 104 thus receives the linear sequence of content segments, but with Advertisement Y instead of Modifiable Advertisement X. By that point in time, however, the content-presentation device 104 may have already sent a request to the content-management system 108 (not shown) for supplemental content for use in replacing Modifiable Advertisement X at a modification start-time, and may have already received Advertisement Z in response to the request.

As discussed above, the content-presentation device's 104 might begin replacing Advertisement Y with Advertisement Z at the modification start-time. But as a result of the aforementioned events, the content-presentation device 104 can determine a short time (e.g., a few seconds) after the modification start-time that there is a mismatch between the reference fingerprint data representing Modifiable Advertisement X and the query fingerprint data representing the content received from the tuner device 500 (i.e., Advertisement Y). In response to detecting the mismatch, the content-presentation device 104 can stop performing the content-replacement operation, which can cause the display of Advertisement Z to abruptly end after a few seconds worth of frames, thus resuming display of Advertisement Y, thereby resulting in an undesirable user experience.

As noted above, in some situations, the content-presentation device 104 might not stop performing the replacement operation and instead can complete the content-replacement operation, thus replacing Advertisement Y with Advertisement Z. However, this can be undesirable too in some situations, such as for an advertiser associated with Advertisement Y.

O. Operations Related to Managing Multiple Requests for Content Modification

The disclosed methods and systems address the above-noted issues and can advantageously improve user experience during content-modification operations such as content-replacement operations. The disclosed methods and systems can also advantageously provide arbitration when content-modification attempts are made by two entities.

Examples of the disclosed features and related features will now be described. Although example operations will be described herein primarily as being performed by the content-management system 108, other entities of the content-modification system 100, such as the fingerprint-matching server 106, could perform one or more of such operations in alternative embodiments. In some examples, the content-modification system 100 can include an additional component, such as a deduplication server or similar computing system, dedicated for use in performing operations such as those described herein and managed by an entity that manages the operations of other devices in the content-modification system 100. In other examples, a deduplication server such as this could be included in, and managed by, a computing system or network managed by a third-party entity, different from a content distributor and different from an entity that is associated with and manages the content-modification system 100.

Furthermore, although example operations will be described herein primarily as involving performance of content-replacement operations by content-presentation devices and tuner devices, other types of content-modification operations are possible as well, such as content-overlay operations.

The content-management system 108 can receive a first request for first supplemental content for use by the content-presentation device 104 in performing a first content-modification operation relative to a modifiable content-segment that the content-presentation device 104 is scheduled to receive. For instance, the content-management system 108 can receive the first request from the content-presentation device 104, as discussed above.

In some examples, the fingerprint-matching server 106 can use broadcast-schedule data to determine when the modifiable content-segment is scheduled to air on the channel to which the content-presentation device 104 is tuned. The fingerprint-matching server 106 can then transmit, to the content-presentation device 104, along with the reference fingerprint data representing content on the channel, metadata that identifies an expected transmission timestamp for the modifiable content-segment. The content-presentation device 104 can then use the transmission timestamp to determine a modification start-time for the content-modification opportunity with respect to the modifiable content-segment. The modification start-time can be determined in other ways as well.

The first request can include various information (e.g., in the form of metadata), including but not limited to (i) an Internet protocol (IP) address (e.g., a public IP address of the household to which the content-presentation device 104 belongs), (ii) a device identifier of the content-presentation device 104, (iii) a hashed version of the IP address and/or the device identifier of the content-presentation device 104, (iv) a content-segment identifier for the modifiable content-segment (e.g., an ISCI key or Ad-ID), (v) a transmission time at which a content-distribution system is scheduled to start broadcasting the modifiable content-segment (which can distinguish one scheduled broadcast time of the modifiable content-segment from other possible scheduled broadcast times), (vi) a channel identifier for a channel on which the content-presentation device 104 is scheduled to receive the modifiable content-segment, and/or (vii) other information associated with a household to which the content-presentation device 104 belongs, such as a geolocation of the content-presentation device 104, demographic information, and/or historical content consumption data.

In some examples, the first request can include selection criteria for the first supplemental content, which the content-management system 108 can then use as a basis for selecting the first supplemental content from among multiple supplemental content items that are available for selection. In other examples, the first request can include an identifier for the first supplemental content (e.g., an Ad-ID).

The content-presentation device 104 can be connected to a tuner device 500 that is configured to receive content (e.g., linear sequences of content segments) on various channels from one or more content-distribution systems and transmit the content to the content-presentation device 104. For example, the tuner device 500 can be an Internet-connected STB or other type of tuner device that is not part of the content-modification system 100 and is associated with a content distributor (e.g., MVPD 502). The tuner device 500 can be connected to the content-presentation device 104 via a wired or wireless connection. As an example, the tuner device 500 can be connected to the content-presentation device 104 via a High-Definition Multimedia Interface (HDMI) cable or Ethernet cable.

As discussed above, the tuner device 500 can receive, from the MVPD 502, an instruction to replace an upcoming modifiable content-segment with supplemental content.

As such, the content-management system 108 can also receive a second request for second supplemental content for use by the tuner device 500 in performing a second content-modification operation relative to a modifiable content-segment that the tuner device 500 is scheduled to receive. For instance, the content-management system 108 can receive the second request from the tuner device 500 or other computing device associated with the MVPD 502.

The second request can include various information (e.g., in the form of metadata), including but not limited to (i) an IP address (e.g., a public IP address of the household to which the tuner device 500 belongs), (ii) a device identifier of the tuner device 500, (iii) a hashed version of the IP address and/or the device identifier of the tuner device 500, (iv) a content-segment identifier for the modifiable content-segment (e.g., an ISCI key or Ad-ID), (v) a transmission time at which a content-distribution system is scheduled to start broadcasting the modifiable content-segment (which can distinguish one scheduled broadcast time of the modifiable content-segment from other possible scheduled broadcast times), (vi) a channel identifier for a channel on which the tuner device 500 is scheduled to receive the modifiable content-segment, and/or (vii) other information associated with a household to which the tuner device 500 belongs, such as a geolocation of the tuner device 500, demographic information, and/or historical content consumption data.

In some examples, the second request can include selection criteria for the second supplemental content, which the content-management system 108 can then use as a basis for selecting the second supplemental content from among multiple supplemental content items that are available for selection. In other examples, the second request can include an identifier for the second supplemental content (e.g., an Ad-ID).

The content-management system 108 can receive the first request and the second request at approximately the same time or at different times. For example, the content-presentation device 104 can transmit the first request five minutes in advance of the transmission time of the modifiable content-segment and the tuner device 500 can transmit the second request two minutes in advance of the transmission time of the modifiable content-segment. Other examples are possible as well.

Moreover, in embodiments where a deduplication server or similar device outside of the content-modification system 100 performs at least some of the operations described herein, the deduplication server can receive the first and second requests from proxy servers that are in communication with the content-modification system 100 and with a network associated with the tuner device 500 and the MVPD 502.

The content-management system 108 can determine that the content-presentation device 104 is connected to the tuner device 500.

Further, the act of determining that the content-presentation device 104 is connected to the tuner device 500 can be based on at least a portion of the information in the first and second requests. For example, the content-management system 108 can determine that the first and second requests each identify the same IP address and, based on the determination that the first and second requests each identify the same IP address, determine that the content-presentation device 104 is connected to the tuner device 500.

Additionally or alternatively, the act of determining that the content-presentation device 104 is connected to the tuner device 500 can be based on other information, such as predetermined mapping data that maps the content-presentation device 104 to the tuner device 500 and that is stored in memory accessible to the content-management system 108. In some examples, the act of determining that the content-presentation device 104 is connected to the tuner device 500 based on such information can be performed before the content-management system 108 receives the first and second requests.

The mapping data for the content-presentation device 104 and the tuner device 500 can be determined using one or more of the following techniques. Further, in some embodiments, one or more of the following techniques can be used to identify one or more candidate pairs of content-presentation devices and tuner devices, and then another one or more of the following techniques can be used to resolve which content-presentation device should be mapped to which tuner device.

For example, the content-presentation device 104 can include an automatic content recognition (ACR) module configured to generate ACR data (e.g., fingerprint data and/or watermarks) representing content presented by the content-presentation device 104 and viewed by an end-user on one or more channels. The content-management system 108 can also receive, from the tuner device 500 or from another computing device associated with the MVPD 502, return path data that the tuner device 500 stores. The return path data can be or include data representing what has been received by the tuner device 500 and presented by the content-presentation device 104 (and thus viewed by an end-user) on one or more channels. In practice, the tuner device 500 can record (i.e., store) the return path data in local memory and/or transmit the return path data to the MVPD 502.

The content-management system 108 can thus compare the ACR data to the return path data and, if the ACR data matches at least a portion of the return path data, the content-management system 108 can determine that the content-presentation device 104 is connected to the tuner device 500 and map the two devices as such in the mapping data. Further, in some embodiments, the content-management system 108 can compare the ACR data to one or more channel lineups or other broadcast schedule data associated with the MVPD 502. For instance, the ACR data can include viewing data that the content-management system 108 has determined to be associated with a particular subset of channels. Thus, the content-management system 108 can determine that the content-presentation device 104 is connected to the tuner device 500 based in part on the particular subset of channels being part of the channel lineup.

As another example, the content-presentation device 104 can detect (e.g., using ACR fingerprints) static user interface elements that the content-presentation device 104 displays and that are known to be associated with a particular tuner device and/or with a particular MVPD. Examples of such static user interface elements can include a logo for the MVPD 502 (e.g., on a boot-up screen for the tuner device 500 or elsewhere as part of the graphical user interface provided by the tuner device 500), a TV guide layout, channel menu, or other menu layout. More particularly, the content-presentation device 104 can refer to data that stores, for each of a plurality of tuner devices and/or MVPDs, corresponding known logos, templates of guide layouts, channel menus, etc., and/or other static user interface elements, and can use the data to determine that the content-presentation device 104 is receiving content from a particular tuner device and/or MVPD that corresponds to the detected static user interface elements. The content-presentation device 104 can indicate to the content-management system 108 that this determination has been made, upon which the content-management system 108 can determine that the content-presentation device 104 is connected to the tuner device 500 and map the two devices as such in the mapping data.

As another example, the content-management system 108 can receive, from the content-presentation device 104, a device identifier associated with the tuner device 500, such as an HDMI Consumer Electronics Control (HDMI-CEC) code that the content-presentation device 104 receives from the tuner device 500 via the HDMI connection and that uniquely identifies the tuner device 500. The content-management system 108 can then compare the device identifier to a database containing a plurality of device identifiers, where each device identifier is mapped to a respective corresponding MVPD. This comparison can indicate whether the tuner device 500 to which the content-presentation device 104 is connected is associated with a particular MVPD that is known to instruct its tuner devices to perform content-modification operations. Based at least on this indication, and optionally based also on a determination that the tuner device 500 is configured to perform content-modification operations with respect to modifiable content-segments, the content-management system 108 can determine that the content-presentation device 104 is connected to the tuner device 500 and map the two devices as such in the mapping data.

A determination of whether the tuner device 500 is configured to perform content-modification operations with respect to modifiable content-segments can be performed in various ways. For example, in practice, some tuner devices are configured to frequently perform content-modification operations with respect to certain advertisements or other types of modifiable content-segments, such as nationally-broadcasted advertisements. As such, fingerprint data or other ACR data that is generated and stored by a content-presentation device that is connected to such a tuner device might indicate this type of tuner device behavior. For instance, the ACR data can indicate one or more events in which the content-presentation device 104 was tuned to a particular channel in advance of a particular advertisement that was identified as an upcoming modification opportunity on that channel, but the content-presentation device 104 lost tracking for a duration that substantially coincides with a duration of the advertisement. If at least a threshold number of such events have been detected with respect to the content-presentation device 104 and/or if the content-presentation device 104 has experienced such events at a frequency that exceeds a particular frequency threshold, the content-management system 108 or other component of the content-modification system can responsively determine that the content-presentation device 104 is connected to a tuner device (e.g., tuner device 500) that is configured to perform content-modification operations with respect to modifiable content-segments. Other examples are possible as well.

As another example of determining that the content-presentation device 104 is connected to the tuner device 500, the content-management system 108 might receive, before the first and second requests, other communications from the content-presentation device 104 and the tuner device 500, and such communications might each identify the same IP address.

Based at least in part on the first and second requests, the content-management system 108 can determine that the first and second requests are associated with the same modifiable content-segment. In practice, modifiable content-segments can be broadcast multiple times, such as multiple times per day, per week, etc. Thus, the term "the same modifiable content-segment" as used herein, refers to the same broadcast/transmission time of the modifiable content-segment. That is, a determination that the first and second requests are both associated with the same modifiable content-segment can be or include a determination that the first and second requests are both associated with the same broadcast/transmission time of the modifiable content-segment (e.g., an advertisement that is scheduled to be broadcast at 7:00 pm).

To facilitate this determination, for instance, the content-management system 108 can refer to information included in the first and second requests, such as the information described above. One or more types of information included in the first and second requests, as well as one or more types of additional information (e.g., receipt times of the first and second requests), can be used as factors to increase the confidence with which the content-management system 108 determines that the first and second requests are associated with the same modifiable content-segment. Examples of such factors and combinations of such factors are described in more detail below, although other factors and combinations of factors are possible as well.

As an example, the act of determining that the first and second requests are associated with the same modifiable content-segment can involve determining that the first and second requests include the same content-segment identifier for the modifiable content-segment (e.g., the same ISCI key) and also determining that the first and second requests identify one or more of (i) the same transmission time at which a content-distribution system is scheduled to start broadcasting the modifiable content-segment or (ii) the same channel identifier for a channel on which the content-presentation device 104 and the tuner device 500 are each scheduled to receive the modifiable content-segment.

In some situations, a content-segment identifier of the modifiable content-segment might only indicate the type or content of a content-segment, or an entity with which the content-segment is associated, but might not indicate which of multiple scheduled transmission times for the modifiable content-segment the first and second requests are referring to. Thus, in situations in which one or both of the first and second requests do not identify a transmission time at which a content-distribution system is scheduled to start broadcasting the modifiable content-segment, other factors can be used to determine that the first and second requests are associated with the same modifiable content-segment.

For example, the act of determining that the first and second requests are associated with the same modifiable content-segment can involve determining that the first and second requests include the same content-segment identifier for the modifiable content-segment (e.g., the same ISCI key) and also determining that a first time-point at which the first request was received is within a predefined threshold time (e.g., two minutes) from a second time-point at which the second request was received. The two requests identifying the same modifiable content-segment might not indicate with high confidence that the identified modifiable content-segment have the same transmission time, but if the requests are both received within the predefined threshold time, such as within a few minutes or less of each other, the content-management system 108 might determine that the first and second requests are associated with the same modifiable content-segment.

In other examples, the act of determining that the first and second requests are associated with the same modifiable content-segment can be based at least in part on a match between one or more of the other information described above that can be included in the two requests.

In response to determining that the content-presentation device 104 is connected to the tuner device 500, and further in response to determining that the first and second requests are associated with the same modifiable content-segment, the content-management system 108 can use one or more parameters as a basis to select an action from a set of actions. In particular, the set of actions can include, at a minimum, (i) a first action that facilitates causing the content-presentation device to perform the first content-modification operation in accordance with the first request and (ii) a second action that facilitates causing the tuner device to perform the second content-modification operation in accordance with the second request. The content-management system 108 can then perform the selected action. As such, the content-management system 108 can use the one or more parameters to determine which (if any) of the two requests to select and grant.

In some examples, the content-management system 108 can locally store the one or more parameters and/or can receive the one or more parameters from another computing device in or outside of the content-modification system 100. In further examples, the content-management system 108 can be configured to make the selection based on the one or more parameters in various ways, such as by assigning a respective weight value to each of the one or more parameters.

The one or more parameters can be or include one or more parameters associated with the first and second supplemental content, such as a cost associated with the first and second supplemental content. For example, the cost can be or include a revenue (i.e., yield) for displaying particular supplemental content (e.g., an advertisement impression) to a predefined number of end-users (e.g., one thousand end-users), such as CPM. The content-management system 108 can be configured to select which of the first or second actions would result in a higher CPM lift/increase in yield. As a more particular example, if the content-management system 108 determines that the content-presentation device 104 replacing the modifiable content-segment with the first supplemental content (e.g., a first replacement advertisement) would result in a first expected CPM lift that is higher than a second expected CPM lift that would result from the tuner device 500 replacing the modifiable content-segment with the second supplemental content (e.g., a second replacement advertisement), the content-management system 108 can responsively select the first action.

As another specific example, consider a situation in which a modifiable content-segment—namely, an advertisement—has been sold to a linear advertiser for $10 CPM. An entity with which the content-modification system 100 is associated might have a linear advertising campaign with a CPM of $50 (and a yield of $40) and the MVPD 502 with which the tuner device 500 is associated might have a linear advertising campaign with a CPM of $25 (and a yield of $15). In this situation, the content-management system 108 can be configured to select the first action because the content-presentation device 104 running the first supplemental content (e.g., a first replacement advertisement) in accordance with the $50 CPM campaign can generate a higher yield ($40, in this example) for a content provider. Other examples are possible as well.

In alternative examples, the content-management system 108 could select which of the first or second actions would result in a lower CPM lift.

As another example, the cost can be or include a cost for a content-distribution system, advertiser, or other entity for presenting the first and second supplemental content on content-presentation devices. That is, the cost can be or include a cost that is charged to a particular entity for that entity running particular supplemental content over a period of time, such as a license cost (e.g., x dollars per month to replace advertisements) or a transactional cost (e.g., a CPM cost for replacing 1000 advertisements). For instance, if the first and second supplemental content are a first and second replacement advertisements, respectively, from valid linear advertising campaigns, the content-management system 108 can select the second action if a second cost for displaying the second replacement advertisement on the content-presentation device 104 (after the tuner device 500 performs the modification) is lower than a first cost for displaying the first replacement advertisement on the content-presentation device 104.

In some examples, the one or more parameters can also be or include a number of times content-presentation devices have received and presented the first and second supplemental content. For example, if the number of times content-presentation devices have received and presented the first supplemental content (e.g., a number of impressions for a first replacement advertisement) is lower than a predefined frequency cap (e.g., a desired maximum number of times a household should see particular supplemental content, such as a particular advertisement) and/or lower than the number of times content-presentation devices have received and presented the second supplemental content (e.g., a number of impressions for a second advertisement), the content-management system 108 can responsively select the first action. Alternatively, if the number of times content-presentation devices have received and presented the second supplemental content is lower than the predefined frequency cap (or lower than a different frequency cap) and/or lower than the number of times content-presentation devices have received and presented the first supplemental content, the content-management system 108 can responsively select the second action.

As a more particular example, if the first and second supplemental content are a first and second replacement advertisements, respectively, and the content-management system 108 determines that the second replacement advertisement has already exceeded a frequency cap associated with the second replacement advertisement, the content-management system 108 can responsively select the first action so that a replacement is performed by the content-presentation device 104 with the first replacement advertisement. Other examples are possible as well.

In the examples described above, the frequency cap can apply to a specific linear content campaign, such as a linear advertising campaign that is made up of multiple advertisement creatives, or the frequency cap can apply to specific advertisement creatives. Further, in some examples, the frequency cap can be applied to one or more specific types of content campaigns, including but not limited to a linear content campaign, an addressable linear content campaign, a connected TV (CTV) campaign, and/or mobile content campaign, or can be applied to all such types of campaigns.

In additional examples, a content provider and MVPD 502 may agree to a particular minimum number of impressions that the content provider offers to MVPD 502. Once the minimum number of impressions are met, the content-management system 108 or third-party system (e.g., a separate deduplication server outside of the content-modification system 100) can redirect requests from the tuner device 500 and/or from the content-presentation device 104 to a computing device associated with the content provider, or to a computing device associated with another entity. The content-management system 108 or third-party system may then receive, from the computing device, an indication of whether a particular request from the tuner device 500 and/or the content-presentation device 104 should be granted.

In some examples, the one or more parameters can also be or include a number of times the content-presentation device 104 has received and presented the first and second supplemental content. That is, in addition to or instead of considering how many impressions have been made across a plurality of content-presentation devices, the content-management system 108 can consider how many times the content-presentation device 104 itself has received and presented the first and second supplemental content. For example, if the first supplemental content has been presented by the content-presentation device 104 less than the second supplemental content, the content-management system 108 can select the first action.

In some examples, additionally or alternatively to using one or more parameters associated with the first and second supplemental content, the content-management system 108 can use one or more parameters associated with the modifiable content-segment as a basis to select an action from the set of actions. For instance, the one or more parameters associated with the modifiable content-segment can be or include a number of times content-presentation devices have received and presented the modifiable content-segment.

In some examples, the content-management system 108 (or separate deduplication server outside of the content-modification system 100) can take into account one or more advertisement creative separation rules as an additional or alternative basis for selecting an action to perform. The one or more advertisement creative separation rules can determine whether and where advertisements can be placed within a linear advertisement break. For example, one such rule can be that two advertisements that are from different advertisers that that have the same topic (e.g., car advertisements) in the same advertisement break. Another such rule can be that two advertisements that are from different advertisers that that have the same topic cannot be sequentially adjacent in a linear content sequence during the advertisement break. To facilitate making the decision in view of the one or more advertisement creative separation rules, both the content-presentation device 104 and the tuner device 500 could send, to the content-modification system 108, the ISCI keys for the first and second supplemental content (which the content-modification system 108 can use to derive a product category or genre of the respective supplemental content), or could send messages indicating an identity of the product category or genre of the respective supplemental content. This information can then be used by the content-management system 108 as a basis for selecting an action.

Furthermore, in additional examples, the set of actions can also include a third action that facilitates causing neither the content-presentation device 104 nor the tuner device 500 to perform a content-modification operation relative to the modifiable content-segment. Selection of the third action, for example, can occur in response to the content-management system 108 determining that the number of times content-presentation devices have received and presented the modifiable content-segment is below a predefined threshold. If the modifiable content-segment is an advertisement associated with a linear advertising campaign, for instance, it can be desirable not to replace the advertisement if the linear advertising campaign is underperforming by not having had at least a predefined threshold number of impressions that might have been guaranteed to an advertiser as part of the linear advertising campaign.

The one or more parameters associated with the modifiable content-segment can also be or include a number of times the content-presentation device 104 has received and presented the modifiable content-segment. That is, in addition to or instead of considering how many impressions have been made across a plurality of content-presentation devices, the content-management system 108 can consider how many times the content-presentation device 104 itself has received and presented the modifiable content-segment. For example, if the modifiable content-segment has been presented by the content-presentation device 104 less than a particular number of times, the content-management system 108 can select the third action.

The first action that facilitates causing the content-presentation device 104 to perform the first content-modification operation in accordance with the first request can take various forms. For example, the first action can be or include transmitting a request for a first link pointing to the first supplemental content hosted by the supplemental-content delivery system 112, upon which the supplemental-content delivery system 112 can receive and respond to the request by transmitting the requested first link to the content-management system 108. As another example, the first action can be or include transmitting the first link to the content-presentation device 104.

The second action that facilitates causing the tuner device 500 to perform the second content-modification operation in accordance with the second request can take various forms. For example, the second action can be or include transmitting a request for a second link pointing to the second supplemental content hosted by the supplemental-content delivery system 112 (or perhaps by another supplemental-content delivery system that is not part of the content-modification system 100), upon which the supplemental-content delivery system 112 can receive and respond to the request by transmitting the requested first link to the content-management system 108. As another example, the second action can be or include transmitting the second link to the tuner device 500. As yet another example, the second action can be or include an action that facilitates another computing device providing the tuner device 500 with the second supplemental content, such as a server that is in communication with the MVPD 502 and the tuner device 500 but is not necessarily part of the content-modification system 100, after which the other computing device can deliver, or coordinate with other devices to deliver, the second supplemental content to the tuner device 500. For instance, the second action can be or include transmitting a notification to a server associated with the MVPD 502 to inform the server that the second request has been granted.

Figure 6:
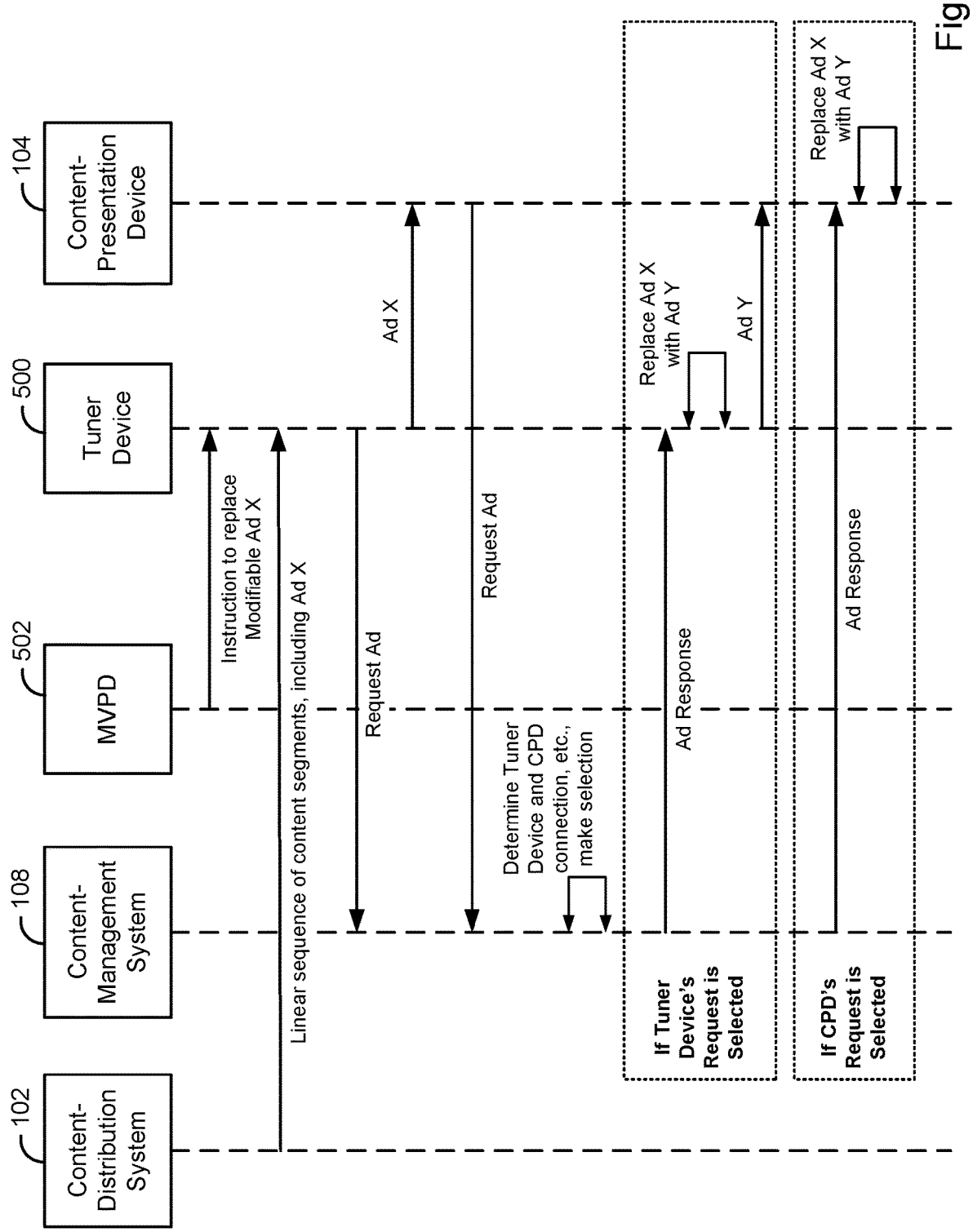
FIG. 6 is a sequence diagram of operations that can be performed for managing multiple content-modification requests.

FIG. 6 is a sequence diagram depicting an example of at least some of the operations described above. As shown, the tuner device 500 and the content-presentation device 104 each send a respective advertisement request to the content-management system 108 to facilitate performance of a respective content-modification operation relative to upcoming Advertisement X. The content-management system 108 can then In response to determining that the content-presentation device 104 is connected to the tuner device 500, and further in response to determining that the two requests are associated with Advertisement X, the content-management system 108 can select an action from the set of actions. As shown, for instance, if the tuner device's 500 request is selected/granted, the content-management system 108 can respond to the request and/or perform other action(s) that facilitate the tuner device 500 replacing Advertisement X with Advertisement Y. Whereas, if the content-presentation device's 104 request is selected/granted, the content-management system 108 can respond to the request and/or perform other action(s) that facilitate the content-presentation device 104 replacing Advertisement X with Advertisement Z.

In alternative examples in which a separate deduplication server outside of the content-modification system 100 (e.g., a third-party server) performs at least some of the operations described herein, the content-management system 108 can act as a proxy device. For instance, the second request can be sent to the deduplication server, but the first request can be sent from the content-presentation device 104 to the content-management system 108, which then forwards the first request to the deduplication server. In addition, if the second request is selected, the deduplication server can send a response to the tuner device 500, but if the first request is selected, the deduplication server can send a response to the content-management system 108, which can then perform an action that facilitates the content-presentation device 104 performing the first content-modification operation, such as transmitting, to the content-presentation device 104, a link to the first supplemental content.

Figure 7:
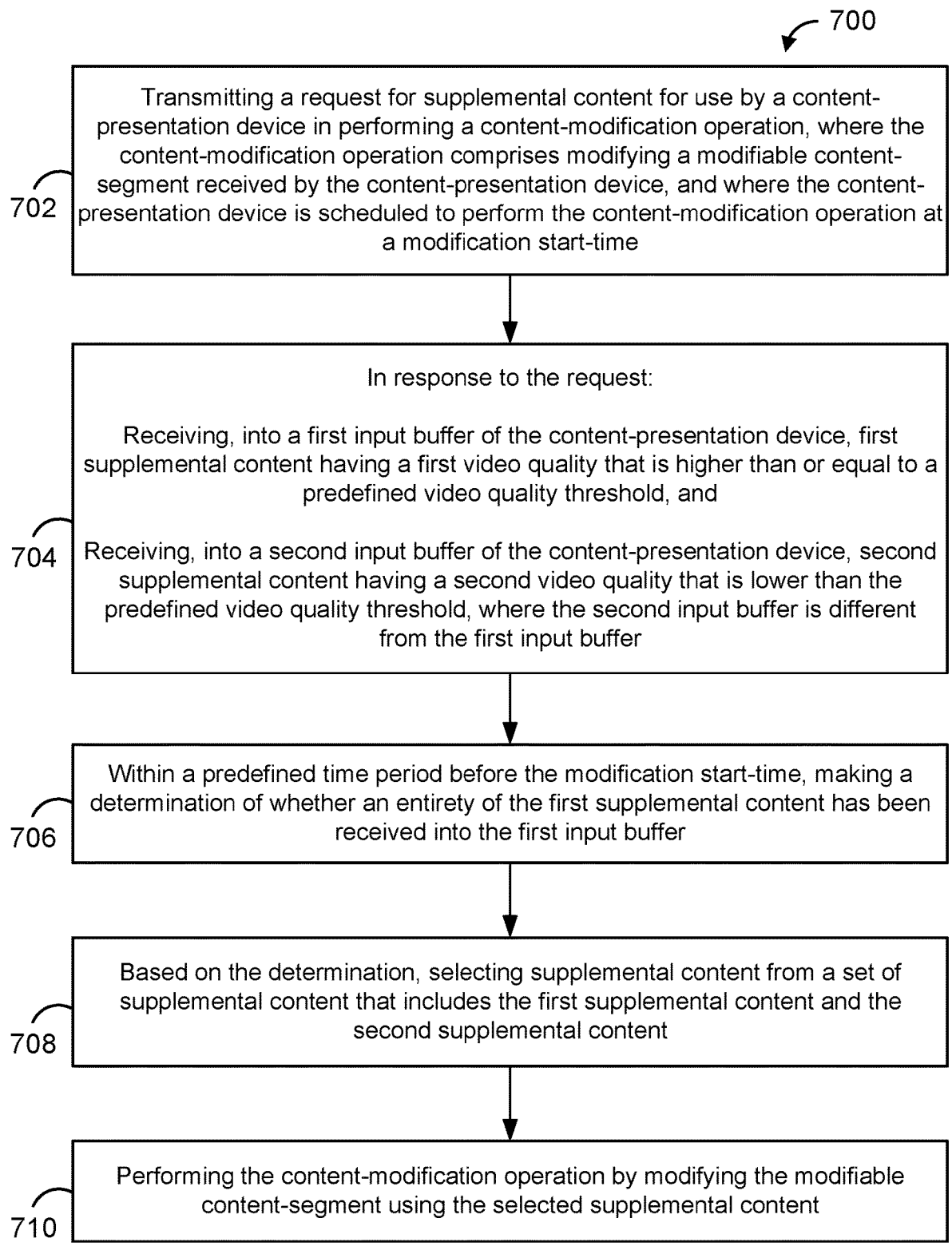
FIG. 7 is a flow chart of an example method.

FIG. 7 is a flow chart of an example method 700. At block 702, the method 700 includes receiving a first request for first supplemental content for use by a content-presentation device in performing a first content-modification operation relative to a modifiable content-segment that the content-presentation device is scheduled to receive.

At block 702, the method 700 includes receiving a second request for second supplemental content for use by a tuner device in performing a second content-modification operation relative to a modifiable content-segment that the tuner device is scheduled to receive.

At block 704, the method 700 includes determining that the content-presentation device is connected to the tuner device.

At block 706, the method 700 includes based at least in part on the first and second requests, determining that the first and second requests are associated with the same modifiable content-segment.

At block 708, the method 700 includes in response to determining that the content-presentation device is connected to the tuner device, and further in response to determining that the first and second requests are associated with the same modifiable content-segment, using one or more parameters as a basis to select an action from a set of actions that includes a first action that facilitates causing the content-presentation device to perform the first content-modification operation in accordance with the first request and a second action that facilitates causing the tuner device to perform the second content-modification operation in accordance with the second request.

At block 710, the method 700 includes performing the selected action.

In some embodiments, the first content-modification operation is scheduled to be performed by the content-presentation device at a modification start-time, and the second content-modification operation is scheduled to be performed by the tuner device before the scheduled modification start-time.

In some embodiments, the content-presentation device is part of a content-modification system, and the tuner device is a STB that is not part of the content-modification system and that is associated with a MVPD.

In some embodiments, the method 700 can also include determining that ACR data generated by the content-presentation device matches at least a portion of return path data stored by the tuner device. In such embodiments, the act of determining that the content-presentation device is connected to the tuner device can be based at least in part on the determination that the ACR data matches at least the portion of the return path data.

In some embodiments, the method 700 can also include receiving, from the content-presentation device, a device identifier associated with the tuner device, and determining that the device identifier matches one of a plurality of device identifiers that are each mapped to a corresponding MVPD. In such embodiments, the act of determining that the content-presentation device is connected to the tuner device can be based at least in part on the determination that the device identifier matches one of the plurality of device identifiers.

In some embodiments, the method 700 can also include determining that the first and second requests each identify the same IP address. In such embodiments, the act of determining that the content-presentation device is connected to the tuner device can be based at least in part on the determination that the first and second requests each identify the same IP address.

In some embodiments, the method 700 can also include determining that the first and second requests each identifies the same content-segment identifier for the modifiable content-segment, and determining that the first and second requests each identifies one or more of (i) the same transmission time at which a content-distribution system is scheduled to start broadcasting the modifiable content-segment or (ii) the same channel identifier for a channel on which the content-presentation device and the tuner device are each scheduled to receive the modifiable content-segment. In such embodiments, the act of determining that the first and second requests are associated with the same modifiable content-segment can be based at least in part on the determination that the first and second requests each identifies the same content-segment identifier for the modifiable content-segment and the determination that the first and second requests each identifies one or more of the same transmission time or the same channel identifier.

In some embodiments, the first request is received at a first time-point, and the second request is received at a second time-point. In such embodiments, the method 700 can also include determining that the first and second requests each include the same content-segment identifier for the modifiable content-segment, and determining that the first time-point is within a predefined threshold time from the second time-point. Further, in such embodiments, the act of determining that the first and second requests are associated with the same modifiable content-segment can be based at least in part on the determination that the first and second requests each include the same content-segment identifier for the modifiable content-segment and the determination that the first time-point is within a predefined threshold time from the second time-point.

In some embodiments, the one or more parameters can include one or more of a cost associated with the first and second supplemental content or a number of times content-presentation devices have received and presented the first and second supplemental content.

In some embodiments, the one or more parameters can include a number of times content-presentation devices have received and presented the modifiable content-segment. In such embodiments, the set of actions can also include a third action that facilitates causing neither the content-presentation device nor the tuner device to perform a content-modification operation relative to the modifiable content-segment, and the act of using the one or more parameters as a basis to select an action from the set of actions can involve selecting the third action when the number of times content-presentation devices have received and presented the modifiable content-segment is below a predefined threshold.

In some embodiments, the first content-modification operation can be a first content-replacement operation in which the modifiable content-segment is replaced with the first supplemental content, and the second content-modification operation can be a second content-replacement operation in which the modifiable content-segment is replaced with the second supplemental content.

IV. Example Variations

Although the examples and features described above have been described in connection with specific entities and specific operations, in practice, there are likely to be many instances of these entities and many instances of these operations being performed, perhaps contemporaneously or simultaneously, on a large-scale basis. Indeed, in practice, the content-modification system 100 is likely to include many content-distribution systems (each potentially transmitting content on many channels) and many content-presentation devices, with some or all of the described operations being performed on a routine and repeating basis in connection with some or all of these entities.

In addition, although some of the operations described in this disclosure have been described as being performed by a particular entity, the operations can be performed by any entity, such as the other entities described in this disclosure. Further, although the operations have been recited in a particular order and/or in connection with example temporal language, the operations need not be performed in the order recited and need not be performed in accordance with any particular temporal restrictions. However, in some instances, it can be desired to perform one or more of the operations in the order recited, in another order, and/or in a manner where at least some of the operations are performed contemporaneously/simultaneously. Likewise, in some instances, it can be desired to perform one or more of the operations in accordance with one more or the recited temporal restrictions or with other timing restrictions. Further, each of the described operations can be performed responsive to performance of one or more of the other described operations. Also, not all of the operations need to be performed to achieve one or more of the benefits provided by the disclosure, and therefore not all of the operations are required.

Although certain variations have been described in connection with one or more examples of this disclosure, these variations can also be applied to some or all of the other examples of this disclosure as well and therefore aspects of this disclosure can be combined and/or arranged in many ways. The examples described in this disclosure were selected at least in part because they help explain the practical application of the various described features.

Also, although select examples of this disclosure have been described, alterations and permutations of these examples will be apparent to those of ordinary skill in the art. Other changes, substitutions, and/or alterations are also possible without departing from the invention in its broader aspects as set forth in the following claims.

What is claimed is:

1. A method comprising:
    receiving a first request for first supplemental content for use by a content-presentation device in performing a first content-modification operation relative to a modifiable content-segment that the content-presentation device is scheduled to receive;
    receiving a second request for second supplemental content for use by a tuner device in performing a second content-modification operation relative to a modifiable content-segment that the tuner device is scheduled to receive;
    determining that the content-presentation device is connected to the tuner device;
    based at least in part on the first and second requests, determining that the first and second requests are associated with the same modifiable content-segment;
    in response to determining that the content-presentation device is connected to the tuner device, and further in response to determining that the first and second requests are associated with the same modifiable content-segment, using one or more parameters as a basis to select an action from a set of actions that includes a first action that facilitates causing the content-presentation device to perform the first content-modification operation in accordance with the first request and a second action that facilitates causing the tuner device to perform the second content-modification operation in accordance with the second request; and
    performing the selected action.

2. The method of claim 1, wherein the first content-modification operation is scheduled to be performed by the content-presentation device at a modification start-time, and
    wherein the second content-modification operation is scheduled to be performed by the tuner device before the scheduled modification start-time.

3. The method of claim 1, wherein the content-presentation device is part of a content-modification system, and
    wherein the tuner device is a set-top box (STB) that is not part of the content-modification system and that is associated with a multi-channel video program distributor (MVPD).

4. The method of claim 1, further comprising:
    determining that automatic content recognition (ACR) data generated by the content-presentation device matches at least a portion of return path data stored by the tuner device,
    wherein determining that the content-presentation device is connected to the tuner device is based at least in part on the determination that the ACR data matches at least the portion of the return path data.

5. The method of claim 1, further comprising:
    receiving, from the content-presentation device, a device identifier associated with the tuner device; and
    determining that the device identifier matches one of a plurality of device identifiers that are each mapped to a corresponding multi-channel video program distributor (MVPD),
    wherein determining that the content-presentation device is connected to the tuner device is based at least in part on the determination that the device identifier matches one of the plurality of device identifiers.

6. The method of claim 1, further comprising:
    determining that the first and second requests each identify the same Internet Protocol (IP) address,
    wherein determining that the content-presentation device is connected to the tuner device is based at least in part on the determination that the first and second requests each identify the same IP address.

7. The method of claim 1, further comprising:
    determining that the first and second requests each identifies the same content-segment identifier for the modifiable content-segment; and
    determining that the first and second requests each identifies one or more of (i) the same transmission time at which a content-distribution system is scheduled to start broadcasting the modifiable content-segment or (ii) the same channel identifier for a channel on which the content-presentation device and the tuner device are each scheduled to receive the modifiable content-segment, wherein determining that the first and second requests are associated with the same modifiable content-segment is based at least in part on the determination that the first and second requests each identifies the same content-segment identifier for the modifiable content-segment and the determination that the first and second requests each identifies one or more of the same transmission time or the same channel identifier.

8. The method of claim 1, wherein the first request is received at a first time-point, and
wherein the second request is received at a second time-point,
the method further comprising:
 determining that the first and second requests each include the same content-segment identifier for the modifiable content-segment; and
 determining that the first time-point is within a predefined threshold time from the second time-point,
wherein determining that the first and second requests are associated with the same modifiable content-segment is based at least in part on the determination that the first and second requests each include the same content-segment identifier for the modifiable content-segment and the determination that the first time-point is within a predefined threshold time from the second time-point.

9. The method of claim 1, wherein the one or more parameters include one or more of a cost associated with the first and second supplemental content or a number of times content-presentation devices have received and presented the first and second supplemental content.

10. The method of claim 1, wherein the one or more parameters include a number of times content-presentation devices have received and presented the modifiable content-segment,
 wherein the set of actions further includes a third action that facilitates causing neither the content-presentation device nor the tuner device to perform a content-modification operation relative to the modifiable content-segment, and
 wherein using the one or more parameters as a basis to select an action from the set of actions comprises selecting the third action when the number of times content-presentation devices have received and presented the modifiable content-segment is below a predefined threshold.

11. The method of claim 1, wherein the first content-modification operation is a first content-replacement operation in which the modifiable content-segment is replaced with the first supplemental content, and
 wherein the second content-modification operation is a second content-replacement operation in which the modifiable content-segment is replaced with the second supplemental content.

12. A non-transitory computer-readable storage medium, having stored thereon program instructions that, upon execution by a processor, cause performance of a set of operations comprising:
 receiving a first request for first supplemental content for use by a content-presentation device in performing a first content-modification operation relative to a modifiable content-segment that the content-presentation device is scheduled to receive;
 receiving a second request for second supplemental content for use by a tuner device in performing a second content-modification operation relative to a modifiable content-segment that the tuner device is scheduled to receive;
 determining that the content-presentation device is connected to the tuner device;
 based at least in part on the first and second requests, determining that the first and second requests are associated with the same modifiable content-segment;
 in response to determining that the content-presentation device is connected to the tuner device, and further in response to determining that the first and second requests are associated with the same modifiable content-segment, using one or more parameters as a basis to select an action from a set of actions that includes a first action that facilitates causing the content-presentation device to perform the first content-modification operation in accordance with the first request and a second action that facilitates causing the tuner device to perform the second content-modification operation in accordance with the second request; and
 performing the selected action.

13. The non-transitory computer-readable storage medium of claim 12, wherein the first content-modification operation is scheduled to be performed by the content-presentation device at a modification start-time, and
 wherein the second content-modification operation is scheduled to be performed by the tuner device before the scheduled modification start-time.

14. The non-transitory computer-readable storage medium of claim 12, wherein the content-presentation device is part of a content-modification system, and
 wherein the tuner device is a set-top box (STB) that is not part of the content-modification system and that is associated with a multi-channel video program distributor (MVPD).

15. The non-transitory computer-readable storage medium of claim 12, the set of operations further comprising:
 determining that automatic content recognition (ACR) data generated by the content-presentation device matches at least a portion of return path data stored by the tuner device,
 wherein determining that the content-presentation device is connected to the tuner device is based at least in part on the determination that the ACR data matches at least the portion of the return path data.

16. The non-transitory computer-readable storage medium of claim 12, the set of operations further comprising:
 receiving, from the content-presentation device, a device identifier associated with the tuner device; and
 determining that the device identifier matches one of a plurality of device identifiers that are each mapped to a corresponding multi-channel video program distributor (MVPD),
 wherein determining that the content-presentation device is connected to the tuner device is based at least in part on the determination that the device identifier matches one of the plurality of device identifiers.

17. The non-transitory computer-readable storage medium of claim 12, the set of operations further comprising:
 determining that the first and second requests each identifies the same content-segment identifier for the modifiable content-segment; and
 determining that the first and second requests each identifies one or more of (i) the same transmission time at which a content-distribution system is scheduled to start broadcasting the modifiable content-segment or (ii) the same channel identifier for a channel on which the content-presentation device and the tuner device are each scheduled to receive the modifiable content-segment, wherein determining that the first and second requests are associated with the same modifiable content-segment is based at least in part on the determination that the first and second requests each identifies the same content-segment identifier for the modifiable content-segment and the determination that the first and second requests each identifies one or more of the same transmission time or the same channel identifier.

18. The non-transitory computer-readable storage medium of claim 12, wherein the first request is received at a first time-point, and wherein the second request is received at a second time-point, the set of operations further comprising:

determining that the first and second requests each include the same content-segment identifier for the modifiable content-segment; and determining that the first time-point is within a predefined threshold time from the second time-point, wherein determining that the first and second requests are associated with the same modifiable content-segment is based at least in part on the determination that the first and second requests each include the same content-segment identifier for the modifiable content-segment and the determination that the first time-point is within a predefined threshold time from the second time-point.

19. The non-transitory computer-readable storage medium of claim 12, wherein the one or more parameters include one or more of a cost associated with the first and second supplemental content or a number of times content-presentation devices have received and presented the first and second supplemental content.

20. A computing system comprising:

a processor; and a non-transitory computer-readable storage medium, having stored thereon program instructions that, upon execution by the processor, cause performance of a set of operations comprising:

receiving a first request for first supplemental content for use by a content-presentation device in performing a first content-modification operation relative to a modifiable content-segment that the content-presentation device is scheduled to receive;

receiving a second request for second supplemental content for use by a tuner device in performing a second content-modification operation relative to a modifiable content-segment that the tuner device is scheduled to receive;

determining that the content-presentation device is connected to the tuner device;

based at least in part on the first and second requests, determining that the first and second requests are associated with the same modifiable content-segment;

in response to determining that the content-presentation device is connected to the tuner device, and further in response to determining that the first and second requests are associated with the same modifiable content-segment, using one or more parameters as a basis to select an action from a set of actions that includes a first action that facilitates causing the content-presentation device to perform the first content-modification operation in accordance with the first request and a second action that facilitates causing the tuner device to perform the second content-modification operation in accordance with the second request; and performing the selected action.

* * * * *